(12) United States Patent
Yang et al.

(10) Patent No.: US 11,719,665 B2
(45) Date of Patent: Aug. 8, 2023

(54) PACKAGE STRUCTURE FOR CHEMICAL SYSTEM

(71) Applicants: PROLOGIUM TECHNOLOGY CO., LTD., Taoyuan (TW); PROLOGIUM HOLDING, INC., Grand Cayman (KY)

(72) Inventors: Szu-Nan Yang, Taoyuan (TW); Chin-Liang Liu, Taoyuan (TW); Meng-Hung Wu, Taoyuan (TW); Wen-Xin Fei, Taoyuan (TW)

(73) Assignees: Prologium Holding Inc., Grand Cayman (KY); Prologium Technology Co., Ltd., Taoyuan (TW)

(*) Notice: Subject to any disclaimer, the term of this patent is extended or adjusted under 35 U.S.C. 154(b) by 468 days.

(21) Appl. No.: 16/866,803

(22) Filed: May 5, 2020

(65) Prior Publication Data

US 2020/0363364 A1    Nov. 19, 2020

(30) Foreign Application Priority Data

May 15, 2019   (TW) .................................. 108116760

(51) Int. Cl.
| | | |
|---|---|---|
| *H01M 50/124* | (2021.01) | |
| *H01M 50/186* | (2021.01) | |
| *G01N 27/30* | (2006.01) | |
| *B32B 27/30* | (2006.01) | |
| *H01M 50/184* | (2021.01) | |

(52) U.S. Cl.
CPC ............. *G01N 27/30* (2013.01); *B32B 27/30* (2013.01); *H01M 50/1245* (2021.01); *H01M 50/184* (2021.01); *H01M 50/186* (2021.01); *B32B 2274/00* (2013.01); *B32B 2405/00* (2013.01)

(58) Field of Classification Search
None
See application file for complete search history.

(56) References Cited

U.S. PATENT DOCUMENTS

2016/0249474 A1* 8/2016 Yang ................... H01M 50/191
2018/0108879 A1* 4/2018 Yang ................... H01M 10/052

* cited by examiner

*Primary Examiner* — Haixia Zhang
(74) *Attorney, Agent, or Firm* — Rosenberg, Klein & Lee

(57) ABSTRACT

The present application provides a package structure for a chemical system, which comprises an inner glue frame and a first outer glue frame. The inner glue frame forms an accommodating space for accommodating a chemical system. The first outer glue frame is further disposed outside the inner glue frame and used for isolating the ambient environment and thus avoiding the influence of the ambient environment on the chemical system. A second outer glue frame is further disposed for avoiding damages such as side bumps and falls of the chemical system or contact with foreign metals. Thereby, the performance of the chemical system can be maintained.

21 Claims, 28 Drawing Sheets

PACKAGE STRUCTURE FOR CHEMICAL SYSTEM

FIELD OF THE INVENTION

The present application relates generally to a package structure, and particularly to a package structure for a chemical system.

BACKGROUND OF THE INVENTION

As technologies develop and progress, the applications of materials have evolved from simple physical properties of macroscopic structures, such as mechanical strength, to microscopic operations, including energy conversion, such as photon or electron excitation or conversion, and molecular variations, such as molecular spin-angle variation. To ensure materials free from influences by other factors in microscopic operations, how to dispose a material in an isolated space for avoiding interference from the ambient, such as vapor or air, has become an important subject. For example, place a microscopic system in a sealed spaced for avoiding influences by ambient vapor or air. This microscopic system can be a chemical system, such as an electrochemical reaction system, a color field conversion system for LED fluorescent powders, or a liquid-crystal molecular variation system.

Accordingly, the present application provides a package structure for a chemical system for avoiding ambient influences on the operations of a microscopic chemical system.

SUMMARY

An objective of the present application is to provide a package structure for a chemical system, which comprises an inner glue frame and a first outer glue frame. The inner glue frame forms an accommodating space for accommodating a chemical system. The inner glue frame will not be moisturized or damaged by the chemical system. The first outer glue frame is further disposed outside the inner glue frame and used for isolating the ambient environment and thus avoiding the influence of the ambient environment on the chemical system. Thereby, the stability of the chemical system can be maintained.

Another objective of the present application is to provide a package structure for a chemical system, which further comprises a second outer glue frame used for preventing damages on the chemical system by side bumps or falls or preventing contact between the chemical system and foreign metals. Thereby, the stability of the chemical system can be maintained.

To achieve the above objectives, the present application discloses a package structure for a chemical system, which comprises a first substrate, a second substrate, an inner glue frame, and a first outer glue frame. The second substrate is opposing to the first substrate. The inner glue frame is disposed between the first substrate and the second substrate for forming an accommodating space. A chemical system is accommodated in the accommodating space. The first outer glue frame is disposed between the first substrate and the second substrate and located on an outer side of the inner glue frame. The inner glue frame is selected from a thermosetting plastic; the first outer glue frame is selected from a thermoplastic.

According to an embodiment of the package structure of the present application, the first outer glue frame includes a first glue frame and a second glue frame. The first glue frame is disposed on an inner side of the first substrate. The second glue frame is disposed on an inner side of the second substrate and combined with the first glue frame.

According to an embodiment of the package structure of the present application, the first glue frame and the second glue frame are combined by a high-temperature pressing process.

According to an embodiment of the package structure of the present application, the inner glue frame further includes a first inner glue layer, a third inner glue layer, and a second inner glue layer. The first inner glue layer is disposed on the inner side of the first substrate. The third inner glue layer is disposed on the inner side of the second substrate. The second inner glue layer is disposed between the first inner glue layer and the third inner glue layer.

According to an embodiment of the package structure of the present application, the molar percentage of carbon in the first and third inner glue layers is greater than the molar percentage of carbon in the second inner glue layer.

According to an embodiment of the package structure of the present application, the molar percentage of oxygen in the second inner glue layer is higher than that in the first and third inner glue layers.

According to an embodiment of the present application, the package structure for chemical system further comprises a first protection layer disposed on an outer side of the first substrate.

According to an embodiment of the present application, the package structure for chemical system further comprises a first protection layer disposed on an outer side of the second substrate.

According to an embodiment of the package structure of the present application, the first substrate and the second substrate are a first electricity collecting layer and a second electricity collecting layer, respectively. The chemical system is an electrochemical reaction system for supply electrical energy.

According to an embodiment of the package structure of the present application, the electrochemical reaction system further includes a first electrode layer, a second electrode layer, and an isolation layer. The first electrode layer is disposed on the inner side of the first electricity collecting layer. The second electrode layer is disposed on the inner side of the second electricity collecting layer. The isolation layer is disposed between the first electrode layer and the second electrode layer.

According to an embodiment of the package structure of the present application, the first electricity collecting layer is shorter than the second electricity collecting layer According to an embodiment of the present application, the package structure for a chemical system further comprises a second protection layer disposed between the first glue frame and the first substrate.

According to an embodiment of the present application, the package structure for a chemical system further comprises a second protection layer disposed between the second glue frame and the second substrate.

According to an embodiment of the package structure of the present application, the material of the second protection layer includes the thermosetting plastic.

According to an embodiment of the present application, the package structure for chemical system further comprises a second outer glue frame disposed between the first substrate and the second substrate and located on an outer side of the first outer glue frame. The second outer glue frame is selected from the thermosetting plastic.

According to an embodiment of the package structure of the present application, the second outer glue frame further includes a first outer glue layer, a third outer glue layer, and a second outer glue layer. The first outer glue layer is disposed on the inner side of the first substrate. The third inner glue layer is disposed on the inner side of the second substrate. The second outer glue layer is disposed between the first outer glue layer and the third outer glue layer.

According to an embodiment of the package structure of the present application, the molar percentage of carbon in the first and third outer glue layers is higher than that in the second outer glue layers.

According to an embodiment of the package structure of the present application, the molar percentage of oxygen in the second outer glue layer is higher than that in the first and third outer glue layers.

According to an embodiment of the package structure of the present application, one or the combination of the first, second, and third outer glue layers protrudes the first substrate and the second substrate.

According to an embodiment of the package structure of the present application, the second substrate is shorter than the first substrate.

According to an embodiment of the package structure of the present application, the first substrate is shorter than the second substrate.

According to an embodiment of the package structure of the present application, one or the combination of the first substrate and the second substrate aligns with the second outer glue frame.

DETAILED DESCRIPTION

In order to make the structure and characteristics as well as the effectiveness of the present application to be further understood and recognized, the detailed description of the present application is provided as follows along with embodiments and accompanying figures.

It is required for a chemical system to be isolated from the ambient environment for preventing interference on the operation, the present application provides a package structure for chemical system for meeting the long-term demand.

Figure 1:
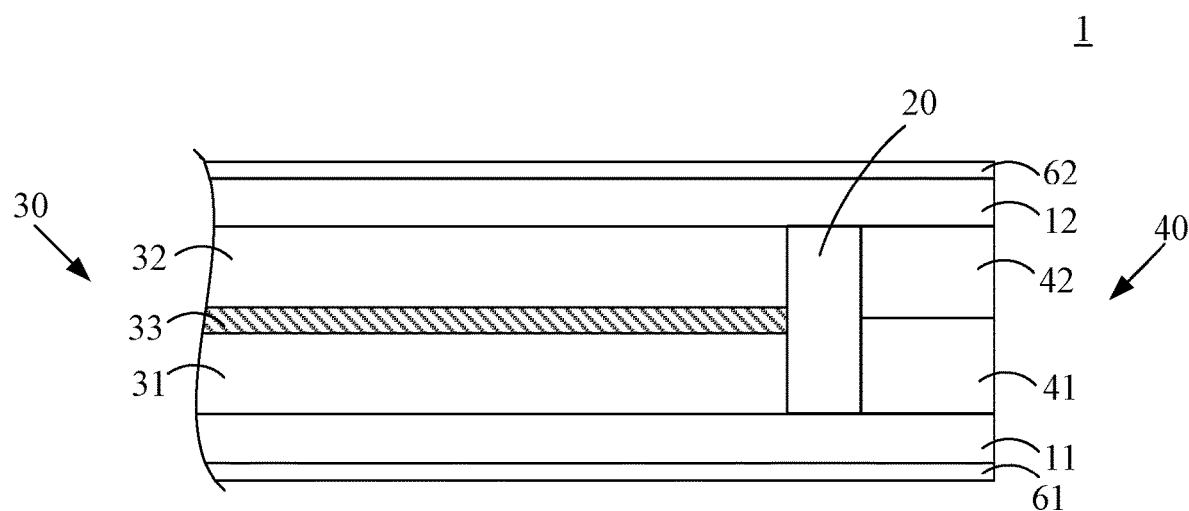
FIG. 1 shows a structural schematic diagram according to the first embodiment of the present application.

In the following, the structure and characteristics of the package structure according to the present application will be further described. Please refer to FIG. 1, which shows a structural schematic diagram according to the first embodiment of the present application. As shown in the figure, the present application discloses a package structure 1 for chemical system, which comprises a first substrate 11, a second substrate 12, an inner glue frame 20, and a first outer glue frame 40. The second substrate 12 is opposing to the first substrate 11. The inner glue frame 20 is disposed between the first substrate 11 and the second substrate 12 for forming an accommodating space and accommodating a chemical system 30. The first outer glue frame 40 is disposed between the first substrate 11 and the second substrate 12 and located on an outer side of the inner glue frame 20. The first outer glue frame 40 includes a first glue frame 41 and a second glue frame 42. The first glue frame 41 is disposed on an inner side of the first substrate 11; the second glue frame 42 is disposed on an inner side of the second substrate 12 and combined with the first glue frame 41. The inner glue frame 20 is selected from a thermosetting plastic; the first outer glue frame 40 is selected from a thermoplastic. The structures on both sides of the package structure according to the present application are identical. Nonetheless, to clearly illustrate the package structure according to the present application, the left structure of the package structure 1 is not shown in FIG. 1.

The inner glue frame of the present application owns the property of not moisturized or damaged by the chemical system 30 and thus avoiding exposure of the chemical system 30 to the ambient environment as well as preventing interference by the ambient environment. For example, if the chemical system 30 includes liquid chemical materials such as liquid electrolyte, the inner glue frame 20 can form an interface with the liquid chemical materials and enabling the chemical materials to self-agglomerate. Thereby, the inner glue frame 20 can isolate chemical materials for avoiding liquid chemical materials from moisturizing and damaging the inner glue frame 20. In addition, the inner glue frame 20 further owns the property of not reacting with the chemical system 30 for maintaining the performance and stability of the operation of the chemical system 30. According to an embodiment of the present application, the material of the inner glue frame 20 can include the thermosetting plastic, which is selected from nonpolarized and low-surface-energy materials such as silica gel, Teflon, or modified polymers. The polymers can be a material selected from the group consisting of modified epoxy, polyethylene, polypropylene, polyurethane, thermal plastic polyurethane, thermal plastic polyimide, silicone, acrylate resin, UV-hardened glue, acrylic resin, polyimide, and combinations thereof. The modification methods of the modified polymers include increasing the molecular weight, shortening the chain length, and adding additives for changing from crystallization tendency to unformed crosslink. Hence, the thermosetting effect can be achieved.

The first outer glue frame 40 according to the present application can isolate the ambient environment effectively for preventing the ambient environment, such as moisture and air, from influencing the operation of the chemical system 30. Thereby, the stability of the chemical system 30 can be maintained. According to an embodiment of the present application, the material of the first outer glue frame 40 can include the thermoplastic. Since the adhesive force of the thermoplastic comes from forming crystals on the interface, no bubbles will be formed. Besides, the crystal-state interface is contributed to reduction of the diffusion of capillarity, and hence isolated ambient moisture or air from entering the first outer glue frame effectively. Thereby, the influence of the ambient environment on the operation of the chemical system 30 can be prevented. The thermoplastic is a material selected from the group consisting of polypropylene, polyethylene, polyester, polyamide, polyurethane, polyimide, and combinations thereof. The first outer glue frame 40 includes the first glue frame 41 and the second glue frame 42, respectively. By using a high-temperature pressing process, the first glue frame 41 and the second glue frame 42 are jointed to form the first outer glue frame 40. The detailed description is as follows.

The method for forming the first outer glue frame 40 is to coat a glue on the inner side of the first substrate 11 and the inner side of the second substrate 12 to form the first glue frame 41 and the second glue frame 42. The high-temperature pressing process is used to joint the first glue frame 41 and the second glue frame 42. First, the first and second glue frames 41, 42 are heated. The heating will not melt the surfaces of the first and second substrates 11, 12. Then the first and second glue frames 41, 42 are pressed to joint. Thereby, it doesn't take long time to combine the first and second glue frames 41, 42. Since the thermoplastic can be fully moisturized in the melting state for anchoring to the object (the first and second substrates 11, 12) to be adhered (the term "anchoring" is used to illustrating that the thermoplastic in the melting state can be permeated into the voids in the interface to the substrates and it can be formed approximate an anchored joint state after curing), the adherence interface can be formed well (crystal-state anchoring). Because the thermoplastic is prone to the influence of the surface roughness of the substrates, compared to the thermosetting plastic, the thermoplastic can construct a longer interface with the substrates for obstructing permeation of ambient objects such as vapor or moisture. In addition, the thermoplastic can own polarized functional groups, which can induce hydrogen bonds and van der Waal force with the substrate surfaces (for example, metal surfaces). Moreover, after the temperature of the high-temperature pressing process is cooled down, the long-chain arrangement inside or on the surface of the thermoplastic can achieve a highly crystallized state. Thereby, the interface between the first and second glue frames 41, 42 of the first outer glue frame 40 can form a highly crystallized state and own the capability of isolating from the ambient environment, such as moisture and air.

Please refer again to FIG. 1. The package structure 1 according to the present application further comprises two first protection layers 61, 62 disposed on the outer sides of the first and second substrates 11, 12, respectively, for protecting the first and second substrates 11, 12, respectively, from bumps, bending, or material deterioration such as oxidation. In addition, the first protection layers 61, 62 can be insulators for achieving electrical isolation. According to an embodiment of the present application, the first protection layers 61, 62 can be, but not limited to, polyimide.

The chemical system 30 as described above can be a system driven by electrical energy, for example, a liquid-crystal-molecule variation system in the liquid crystal field. Alternatively, the chemical system 30 can be a system capable of reacting with electrical energy, for example, a color gamut conversion system for fluorescent power of LED. The chemical system 30 as described above can be an electrochemical supply system, for supplying energy, for example, an energy storage device. The above embodiments are only partial embodiment of the chemical system 30 according to the present application, not used to limiting the chemical system 30 according to the present application to the above embodiments. In the following description, an electrochemical reaction system is adopted as an example of the chemical system 30 according to the present application. Nonetheless, the package structure 1 according to the present application is not limited to be applied an electrochemical reaction system only.

According to the present embodiment, the first and second substrates 11, 12 can be the first and second electricity collecting layers, respectively. The chemical system 30 can be an electrochemical reaction system. The chemical system 30 according to the present embodiment further includes a first electrode layer 31, a second electrode layer 32, and an isolation layer 33. The first electrode layer 31 is disposed on the inner side of the first substrate 11 (the first electricity collecting layer). The second electrode layer 32 is disposed on the inner side of the second substrate 12 (the second electricity collecting layer). The isolation layer 33 is disposed between the first and second electrode layers 31, 32. The first and second substrates 11, 12 can be flexible substrates such as flexible circuit boards, aluminum, or copper. The material of the isolation layer 33 can be two or more selected from the group consisting of polymer materials, ceramic materials, or glass fiber materials. According to another embodiment of the present application, the chemical system is a liquid-crystal-molecule variation system in the liquid crystal field. The first and second substrates 11, 12 can be transparent glass substrates, respectively. Furthermore, according to another embodiment of the present application, the chemical system 30 can be a color gamut conversion system for fluorescent power of LED. The first substrate 11 can be a transparent glass substrate; the second substrate 12 can be an opaque wired substrate such as a printed circuit board (PCB) for disposing LEDs.

Figure 2:
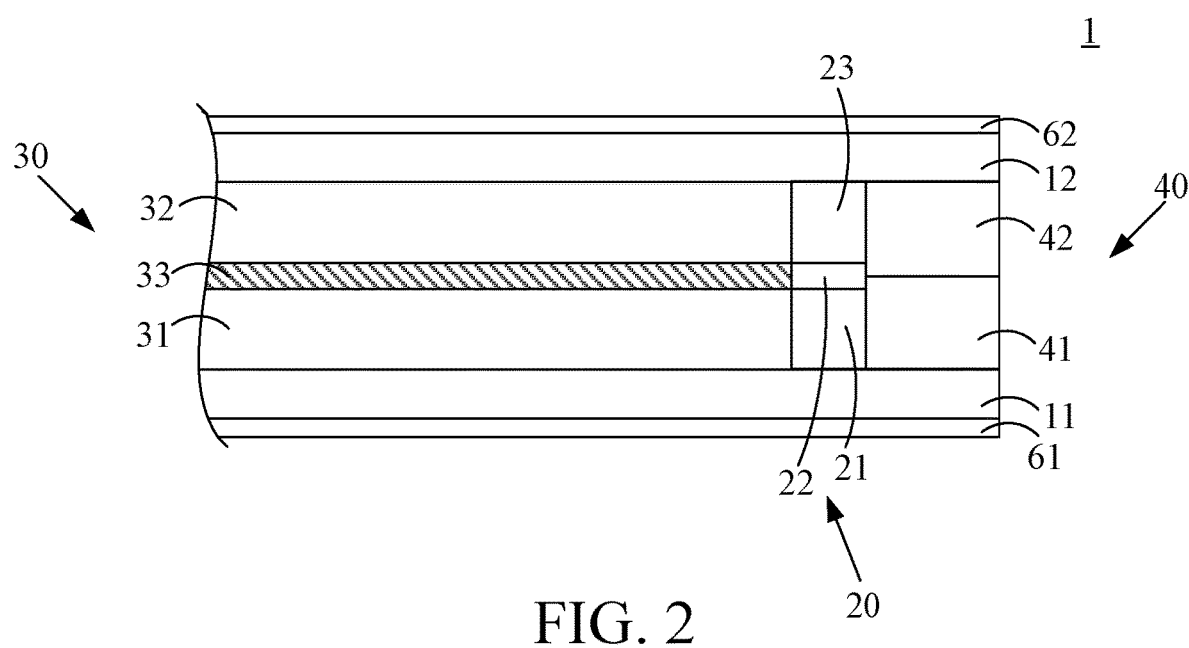
FIG. 2 shows a structural schematic diagram according to the second embodiment of the present application.

Please refer to FIG. 2, which shows a structural schematic diagram according to the second embodiment of the present application. The difference between the present embodiment and the first embodiment is that the inner glue frame 20 according to the present embodiment further includes a first inner glue layer 21, a second inner glue layer 22, and a third inner glue layer 23. The first inner glue layer 21 is disposed on the inner side of the first substrate 11. The third inner glue layer 23 is disposed on the inner side of the second substrate 12. The second inner glue layer 22 is disposed between the first inner glue layer 21 and the third inner glue layer 23. The ingredients of the first, second, and third inner glue layers 21, 22, 23 are modified according to heterogeneous interface and homogeneous interface.

By using different formulas or additives, the adhesion of the first and third inner glue layers 21, 23 according to the present application to heterogeneous surfaces, such as metal substrate surfaces or other polymer substrate surfaces, can be further adjusted such that the first inner glue layer 21 can be adhered firmly to the first substrate 11 and the third inner glue layer 23 can be adhered firmly to the second substrate 12. In the above adjustment, the grafting method can be adopted to increase polarized functional groups such as adding coupling agent with polar and nonpolar functional groups for crosslinking. The main functions of the first and third inner glue layers 21, 23 include structural support, insulation, blocking the chemical materials of the chemical system 30, such as the electrolyte or liquid-crystal molecules (main purpose), and isolating the ambient environment, such as the ambient vapor and air (secondary purpose). The glue property of the first and third inner glue layers 21, 23 enables the surface to have extremely low surface energy so that the chemical materials cannot moisturize the surfaces. Besides, due to their high-density network structure, they have excellent chemical resistance and hence free from erosion by the chemical materials.

Since the cured first and third inner glue layers 21, 23 have less viscous and nonpolar surfaces, it is difficult for them to adhere to other glue types. Thereby, the second inner glue layer 22 is adopted to overcome the adherence problem. Compared with the first and third inner glue layers 21, 23, the second inner glue layer 22 is not modified and its function is mainly to adhere the first and third inner glue layers 21, 23. Thereby, the second inner glue layer 22 has stronger adhesion to homogeneous surfaces such as the first and third inner glue layers 21, 23. In addition, the function of the second inner glue layer 22 also includes blocking the chemical materials in the chemical system 30.

For example, when the first, second, and third inner glue layers 21, 22, 23 are selected from silica gels, the molar percentage of carbon in the first and third inner glue layers 21, 23 is higher than that in the second inner glue layer 22; the molar percentage of oxygen in the second inner glue layer 22 is higher than that in the first and third inner glue layers 21, 23.

Figure 3:
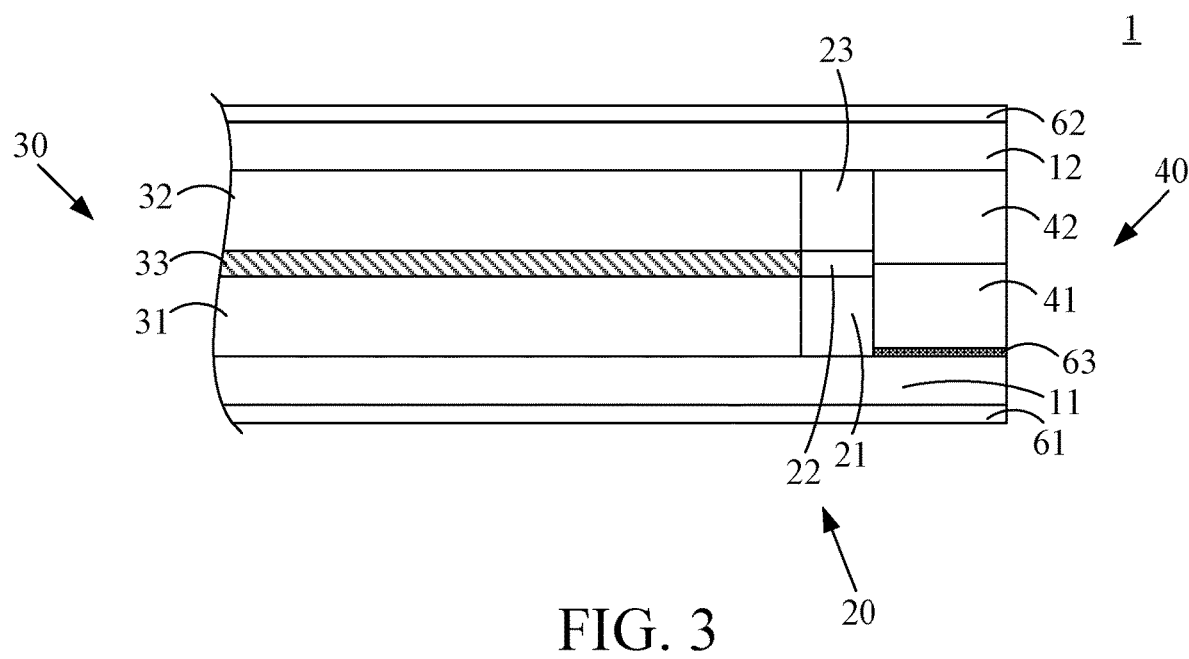
FIG. 3 shows a structural schematic diagram according to the third embodiment of the present application.

Please refer to FIG. 3, which shows a structural schematic diagram according to the third embodiment of the present application. As shown in FIG. 3, the difference between the present embodiment and the second one is that the package structure 1 according to the present embodiment further comprises a second protection layer 63 disposed between the first glue frame 41 and the first substrate 11. The second protection layer 63 is an insulator and the material of the second protection layer 63 is a thermosetting plastic. The material of the thermosetting plastic can be selected from nonpolarized and low-surface-energy materials such as silica gel, Teflon, or modified polymers, in which the polymer is a material selected from the group consisting of modified epoxy, polyethylene, polypropylene, polyurethane, thermal plastic polyurethane, thermal plastic polyimide, silicone, acrylate resin, UV-hardened glue, acrylic resin, polyimide, and combinations thereof. The active functional groups of the second protection layer 63 can form hydrogen bonds and van der Waal force with the surface of the first or second substrate 11, 12. Besides, the high crosslinking reaction inside the second protection layer 63 can also achieve extremely low water absorption rate (<0.3%). Thereby, the second protection layer 63 also has the capability of isolating ambient environment, such as vapor or air.

Furthermore, when the first outer glue frame 40 is damaged by external force or other reasons and compressed and deformed, the second protection layer 63 can prevent the first and second substrates 11, 12 from contacting each other. If the first and second substrates 11, 12 are metal substrates, the second protection layer 63 is used to prevent the first and second substrates 11, 12 to form a short circuit. Namely, the second protection layer 63 can be used for electrical isolation. In addition to being disposed between the first glue frame 41 and the first substrate 11, the second protection layer 63 can also be disposed between the second glue frame 42 and the second substrate 12.

Moreover, the second protection layer 63 is an individually coated curing layer. First, the second protection layer 63 is coated on the inner side of the first or second substrate 11, 12. At this moment, it is not jointed with the first or second glue frame 41, 42 yet. Next, it is heated for curing. While curing, because one side surface of the second protection layer 63 has not jointed with the first or second glue frame 41, 42 yet, it is an open surface, making the gas generated while heating be exhausted easily. In other words, in high-temperature curing, bubbles will not be generated easily within the second protection layer 63. The second protection layer 63 can be as thin as possible for further preventing bubbles generated within the second protection layer 63 and minimizing the side cross-sectional area of the second protection layer 63 contacting the ambient environment, and thus further reducing the total amount of water absorption. According to an embodiment of the present application, the thickness of the second protection layer 63 can be 10 um. Furthermore, the second protection layer 63 can be chosen not to act as the adhesive layer for jointing with other layers. Nonetheless, the present application is not limited to the embodiment.

Figure 4:
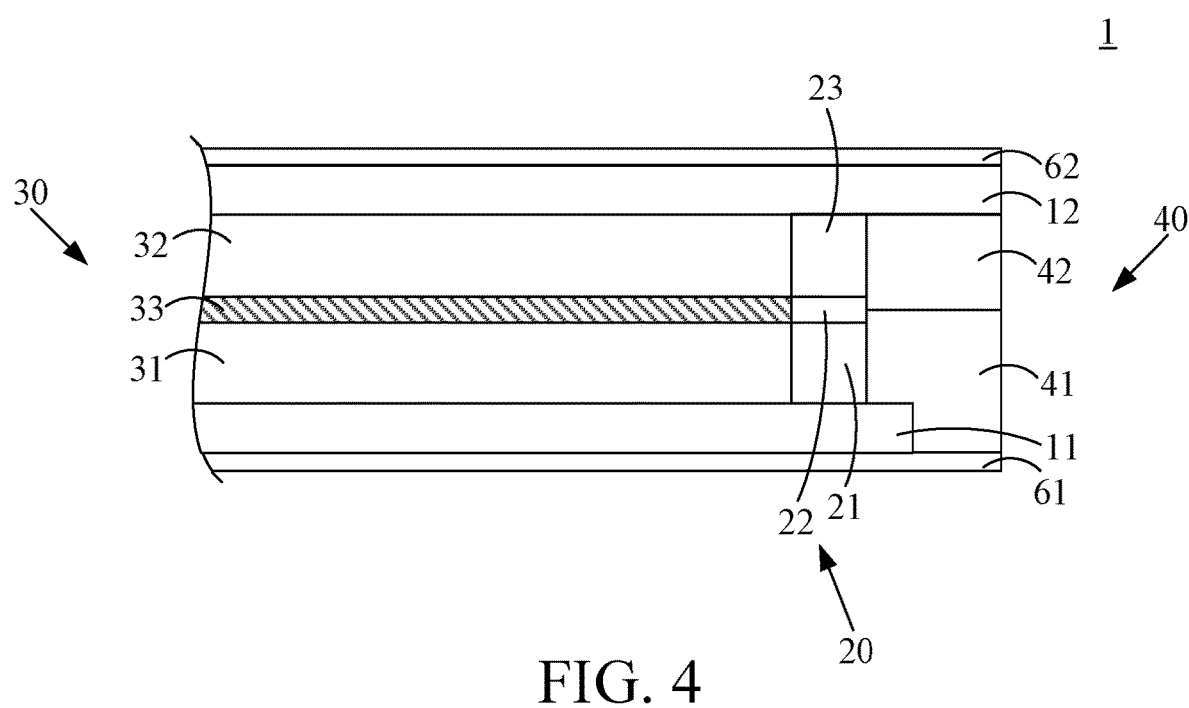
FIG. 4 shows a structural schematic diagram according to the fourth embodiment of the present application.

In addition, the package structure 1 according to the present application can be also applied to the design of the electricity collecting layer complying with the anode/cathode safety design. As shown in FIG. 4, the first substrate 11 is shorter than the second substrate 12. Thereby, the first protection layer 61 will be longer than the first substrate 11 and exposed outside the first substrate 11. As shown in FIG. 4, the second glue frame 42 of the first outer glue frame 40 is connected with the second substrate 12. In addition to connecting to the first substrate 11, the first glue frame 41 is further connected to the inner side of the first protection layer 61 exposed outside the substrate 11.

Figure 5:
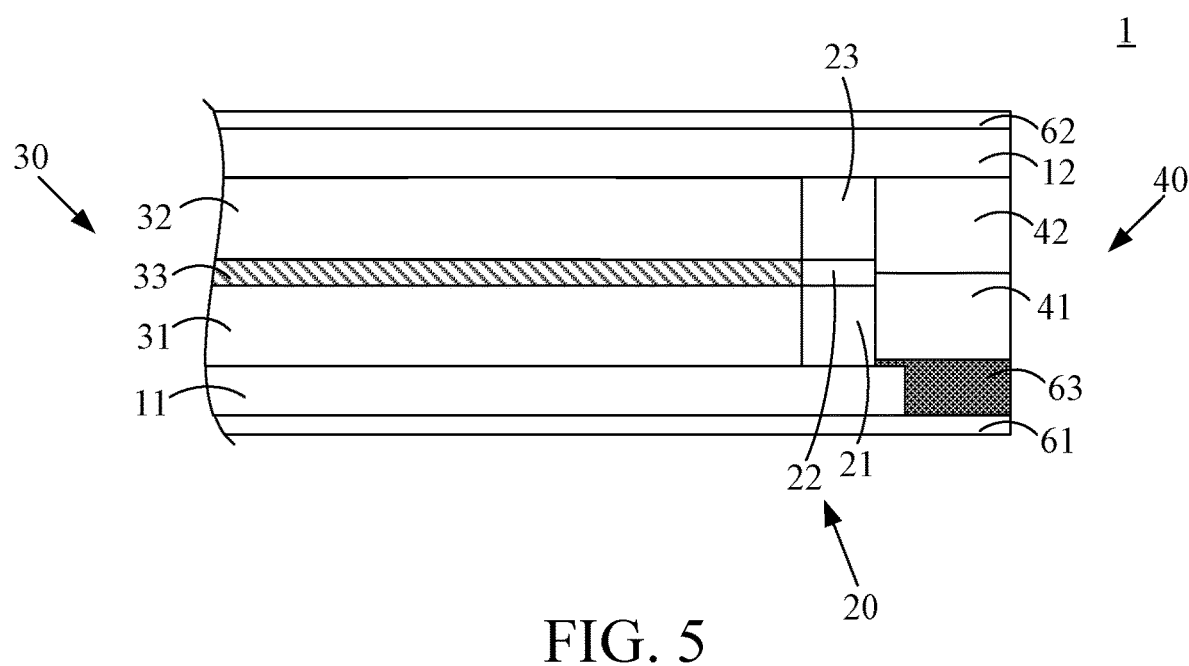
FIG. 5 shows a structural schematic diagram according to the fifth embodiment of the present application.

Likewise, the package structure 1 shown in FIG. 4 can further comprise the second protection layer 63, as shown in FIG. 5. The second protection layer 63 can further cover the bent corner of the first substrate 11 exposed outside the inner glue frame 20. The second protection layer 63 is located between the first substrate 11 and the first glue frame 41 and located between the first protection layer 61 and the first glue frame 41.

Figure 6A:
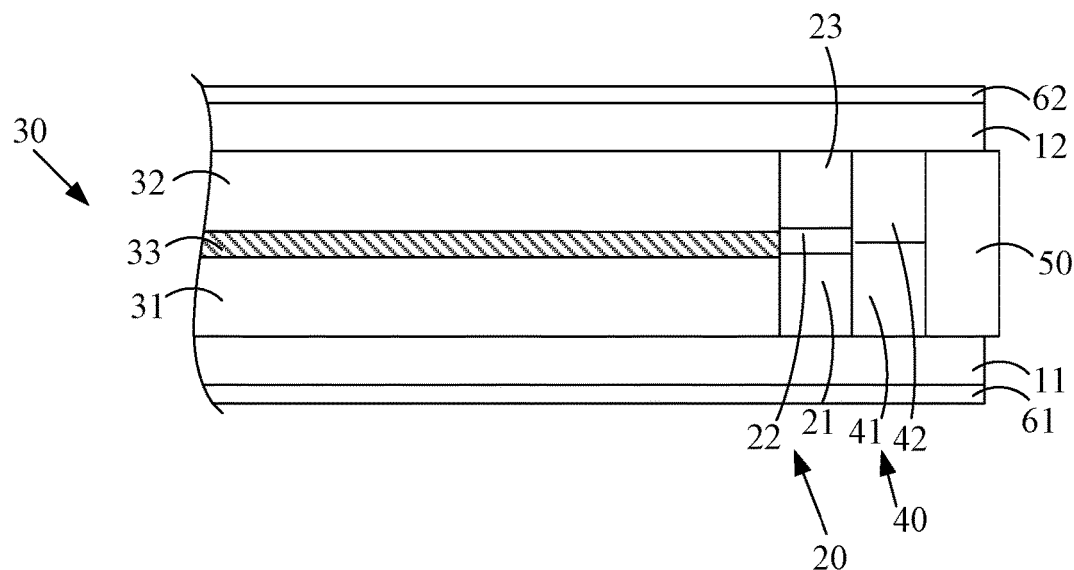
FIG. 6A to FIG. 6H show structural schematic diagrams according to the sixth embodiment of the present application.

As shown in FIG. 6A, the present application can further comprise a second outer glue frame 50 disposed between the first substrate 11 and the second substrate 12 and located on an outer side of the first outer glue frame 40. The second outer glue frame 50 is selected from the thermosetting plastic. The chemical system 30 according to the sixth embodiment is identical to the first, second, third, fourth, and fifth embodiment as described above. The chemical system 30 can be a system driven by electrical energy, for example, a liquid-crystal-molecule variation system in the liquid crystal field. Alternatively, the chemical system 30 can be a system capable of reacting with electrical energy, for example, a color gamut conversion system for fluorescent power of LED. The chemical system 30 as described above can be an electrochemical supply system, for supplying energy, for example, an energy storage device. The above embodiments are only partial embodiment of the chemical system 30 according to the present application, not used to limiting the chemical system 30 according to the present application to the above embodiments. In the following description, an electrochemical reaction system is adopted as an example of the chemical system 30 according to the present application. Nonetheless, the package structure 1 according to the present application is not limited to be applied an electrochemical reaction system only.

According to the present embodiment, the first and second substrates 11, 12 can be the first and second electricity collecting layers, respectively. The chemical system 30 can be an electrochemical reaction system. The chemical system 30 according to the present embodiment further includes the first electrode layer 31, the second electrode layer 32, and the isolation layer 33. The first electrode layer 31 is disposed on the inner side of the first substrate 11 (the first electricity collecting layer). The second electrode layer 31 is disposed on the inner side of the second substrate 12 (the second electricity collecting layer). The isolation layer 33 is disposed between the first and second electrode layers 31, 32. The first and second substrates 11, 12 can be flexible substrates.

Since the first outer glue frame 40 is the thermosetting plastic, when a certain temperature and pressure are applied in the process, it might deform or spill, influencing the effect of isolating the ambient environment. Thereby, the second outer glue frame 50 can act as an obstruction wall for maintaining the original form and effects of the first outer glue frame 40.

According to an embodiment of the present application, the material of the second outer glue frame 50 can include the thermosetting plastic, which is selected from nonpolarized and low-surface-energy materials such as silica gel, Teflon, or modified polymers. The polymers can be a material selected from the group consisting of modified epoxy, polyethylene, polypropylene, polyurethane, thermal plastic polyurethane, thermal plastic polyimide, silicone, acrylate resin UV-hardened glue, acrylic resin, polyimide, and combinations thereof.

The modification methods of the modified polymers include increasing the molecular weight, shortening the chain length, and adding additives for changing from crystallization tendency to unformed crosslink. Hence, the thermosetting effect can be achieved. Besides, due to the property of low surface energy, the second outer glue frame 50 will not adhere to the first outer glue frame 40. At the room temperature, the first and second outer glue frames 40, 50 are repulsive. Thereby, when they are designed to adjacent locations, they can be divided and blocked clearly and effectively.

As shown in FIG. 6A, to avoid short circuit between the first and second substrates 11, 12 due to contact, the second outer glue frame 50 protrudes outside the first and second substrates 11, 12 for prevent contacting. In addition, the second outer glue frame 50 is an elastic glue acting as the outermost structure for reducing the damages on the chemical system owing to bumps or falls and reducing the possibility of contacting foreign metals.

Figure 6B:
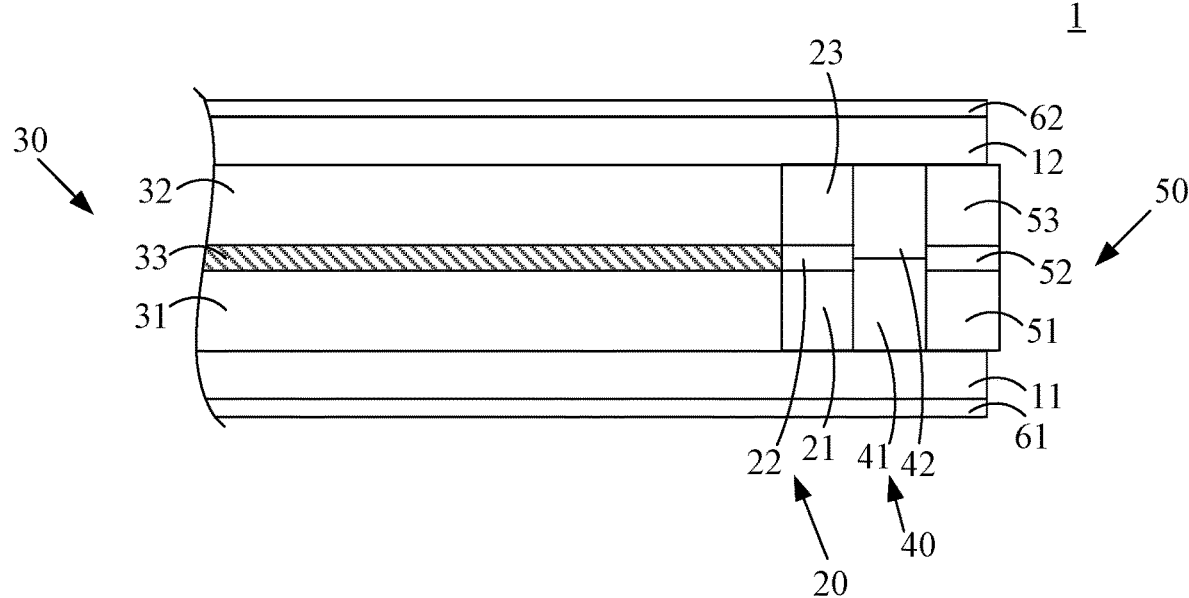

Moreover, as shown in FIG. 6B, the second outer glue frame 50 according to the present embodiment further includes a first outer glue layer 51, a third outer glue layer 53, and a second outer glue layer 52. The first outer glue layer 51 is disposed on the inner side of the first substrate 11. The third outer glue layer 53 is disposed on the inner side of the second substrate 12. The second outer glue layer 52 is disposed between the first outer glue layer 51 and the third outer glue layer 53. Like the description for the inner glue frame 20, the ingredients of the first, second, and third outer glue layers 51, 52, 53 are modified according to heterogeneous interface and homogeneous interface.

By using different formulas or additives, the adhesion of the first and third outer glue layers 51, 53 according to the present application for heterogeneous surfaces, such as metal substrate surfaces or other polymer substrate surfaces, can be further adjusted such that the first outer glue layer 51 can be adhered firmly to the first substrate 11 and the third outer glue layer 53 can be adhered firmly to the second substrate 12. In the above adjustment, the grafting method can be adopted to increase polar functional groups such as adding coupling agent with polar and nonpolar functional groups for crosslinking. The main functions of the first and third outer glue layers 51, 53 include structural support of the first outer glue frame 40 to maintain the structure and functions of the first outer glue frame 40 (main purpose), reducing the damage of the chemical system 30 due to side bumps or falls, and the possibility of contacting between the chemical system and foreign metals (secondary purpose). The glue property of the first and third outer glue layers 51, 53 enables the surface to have extremely low surface energy so that the chemical materials cannot moisturize the surfaces. Besides, due to their high-density network structure, they have excellent chemical resistance and hence free from erosion by the chemical materials.

Since the cured first and third outer glue layers 51, 53 are less viscous and the surfaces are nonpolarized, it is difficult for them to adhere to other glue types. Thereby, the second outer glue layer 52 is adopted to overcome the adherence problem. Compared with the first and third outer glue layers 51, 53, the second outer glue layer 52 is not modified and its function is mainly to adhere the first and third outer glue layers 51, 53. Thereby, the second outer glue layer 52 has stronger adhesion to homogeneous surfaces such as the first and third outer glue layers 51, 53.

For example, when the first, second, and third outer glue layers 51, 52, 53 are selected from silica gels, the molar percentage of carbon in the first and third outer glue layers 51, 53 is higher than that in the second outer glue layer 52; the molar percentage of oxygen in the second outer glue layer 52 is higher than that in the first and third outer glue layers 51, 53.

Figure 6C:
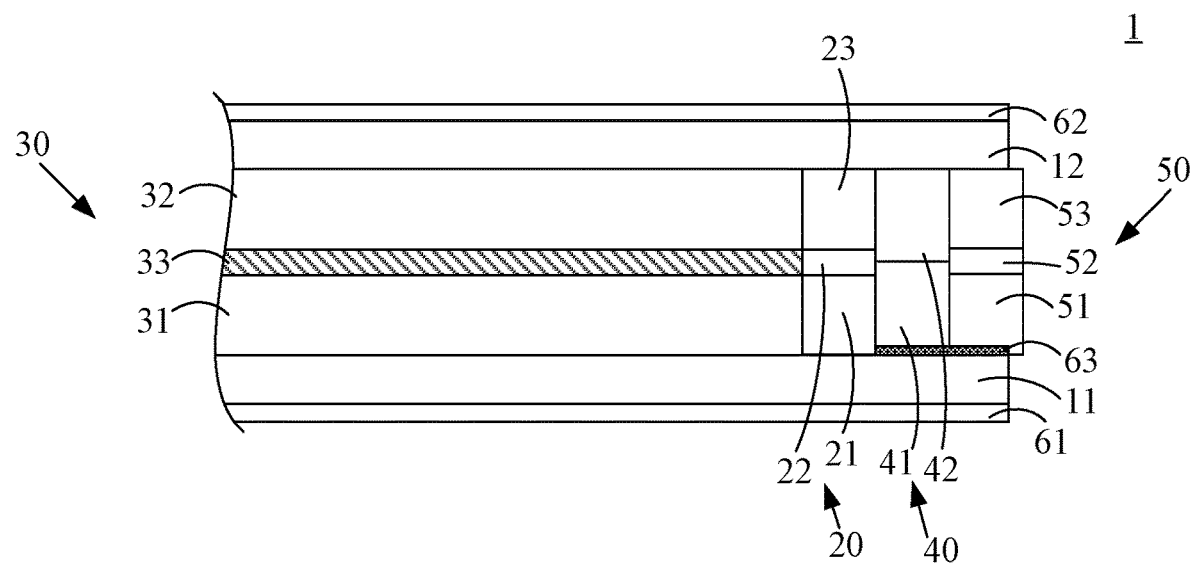

Besides, as shown in FIG. 6C, the second protection layer 63 can be further disposed. In addition to being disposed among the first glue frame 41, the first outer glue layer 51, and the first substrate 11, the second protection layer 63 also can be disposed among the second glue frame 42, the third outer glue layer 53, and the second substrate 12 as well.

The material of the second protection layer 63 is a thermosetting plastic. The material of the thermosetting plastic is selected from the group consisting of nonpolar materials, low-surface-energy materials (such as silica gel, Teflon), or modified polymers. The polymers can be a material selected from the group consisting of modified epoxy, polyethylene, polypropylene, polyurethane, thermal plastic polyurethane, thermal plastic polyimide, silicone, acrylate resin, UV-hardened glue, acrylic resin, polyimide, and combinations thereof. The active functional groups of the second protection layer 63 can form hydrogen bonds and van der Waal force with the surface of the first or second substrate 11, 12. Besides, the high degree of crosslinking reaction inside the second protection layer 63 can also achieve extremely low water absorption rate (<0.3%).

Thereby, the second protection layer 63 also owns the capability of isolating ambient environment, such as vapor or air.

Figure 6D:
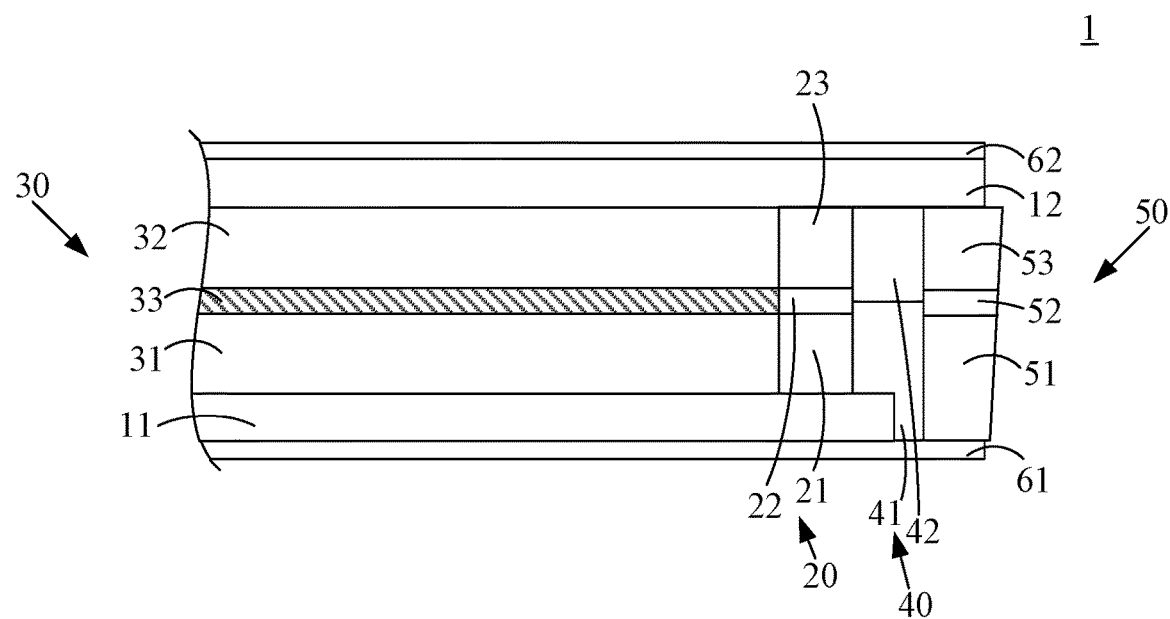

In addition, the package structure 1 according to the present application can be also applied to the design of the electricity collecting layer complying with the anode/cathode safety design. As shown in FIG. 6D, the first substrate 11 is shorter than the second substrate 12. Thereby, the first protection layer 61 will be longer than the first substrate 11 and exposed outside the first substrate 11. As shown in FIG. 6D, the second glue frame 42 of the first outer glue frame 40 is connected with the second substrate 12. In addition to connecting to the first substrate 11, the first glue frame 41 is further connected to the inner side of the first protection layer 61 exposed outside the substrate 11.

Besides, the third outer glue layer 53 of the second outer glue frame 50 is connected with the second substrate 12; and the first outer glue layer 51 is connected with the inner side of the first protection layer 61 exposed outside the first substrate 11. Moreover, when the first substrate 11 is shorter than the second substrate 12, compared with the first outer glue layer 51 and the second outer glue layer 52, the third outer glue layer 53 protrudes the outer side of the second substrate 12. Contrarily, when the second substrate 12 is shorter than the first substrate 11, compared with the third outer glue layer 53 and the second outer glue layer 52, the first outer glue layer 51 protrudes the outer side of the first substrate 11.

Figure 6E:
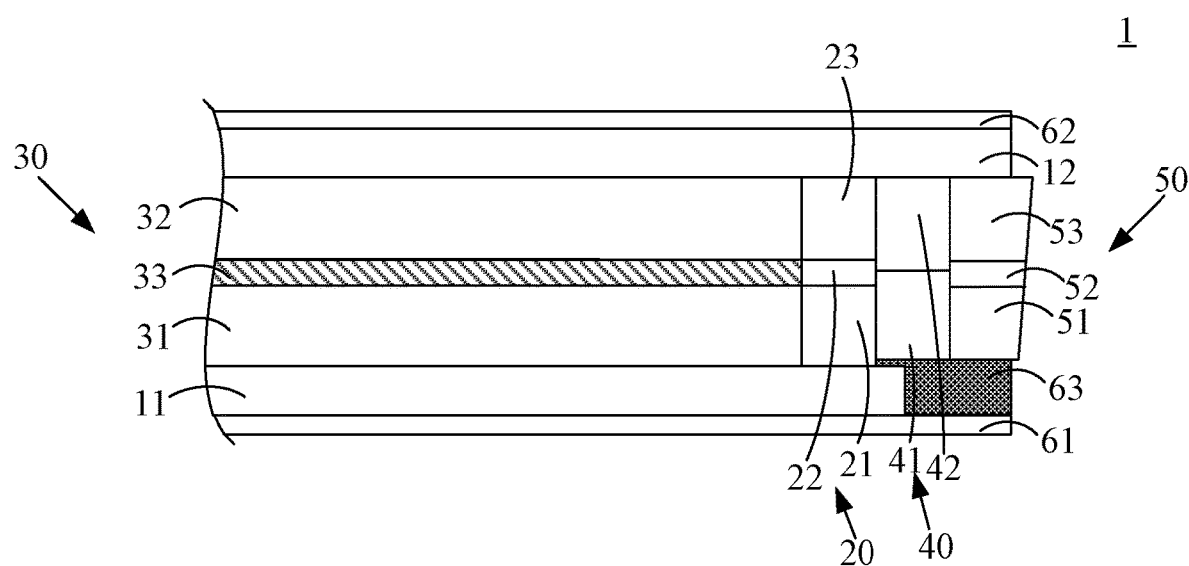

Likewise, the package structure 1 shown in FIG. 6D can further comprise the second protection layer 63, as shown in FIG. 6E. The second protection layer 63 can further cover the bent corner of the first substrate 11 exposed outside the inner glue frame 20. The second protection layer 63 is located between the first substrate 11 and the first glue frame 41 and located among the first protection layer 61, the first glue frame 41, and the first outer glue layer 51.

Moreover, in addition to being disposed among the first glue frame 41, the first outer glue layer 51, and the first substrate 11, the second protection layer 63 can be disposed among the second glue frame 42, the third outer glue layer 53, and the second substrate 12 as well.

To sum up, the present application discloses a package structure for chemical system with a dual- or triple-glue-frame architecture, which comprises the inner glue frame, the first outer glue frame, and furthermore the second outer glue frame. The first outer glue frame is located on the outer side of the inner glue frame. The inner glue frame forms the accommodating space for accommodating the chemical system. The inner glue frame will not be moisturized or damaged by the chemical system. The first outer glue frame can isolate the ambient environment for avoiding ambient influences on the operations of the chemical system. The second outer glue frame is further disposed outside the first glue frame and protruding the first and second substrates for avoiding damages such as side bumps or falls of the chemical system or to prevent the chemical system from contacting with foreign metals. Thereby, the stability of the chemical system can be maintained.

Figure 6F:
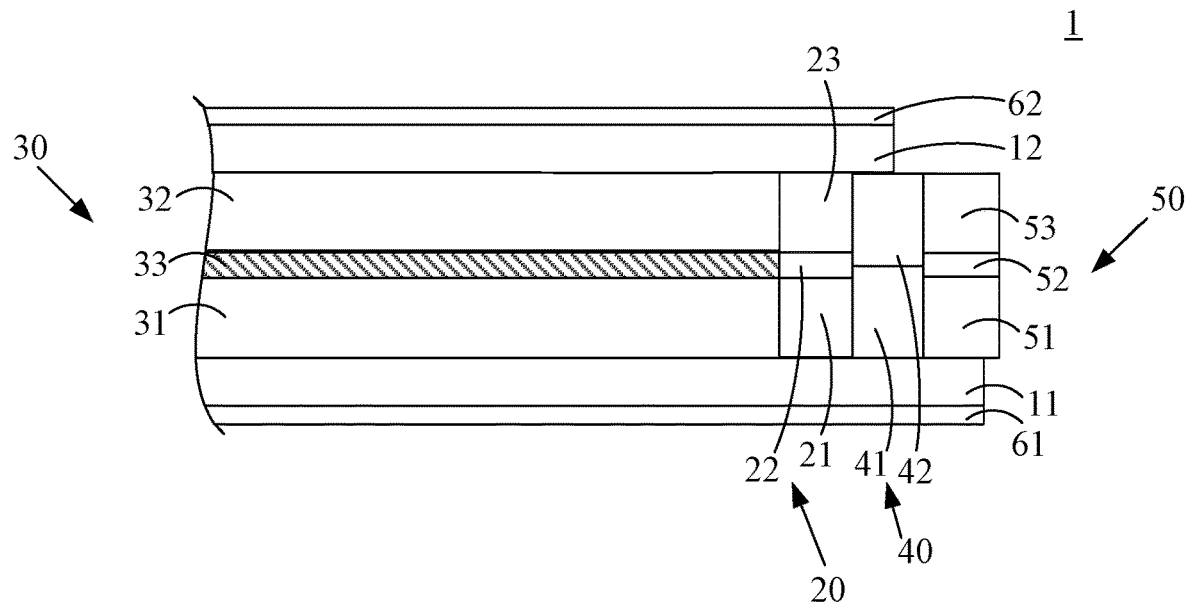
Figure 6G:
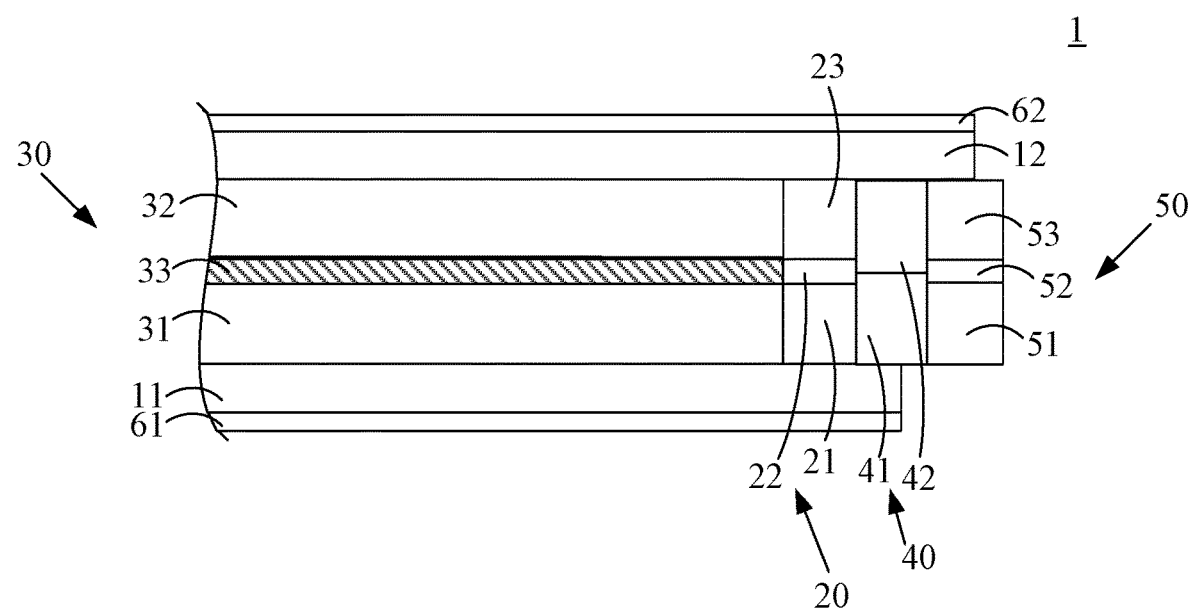
Figure 6H:
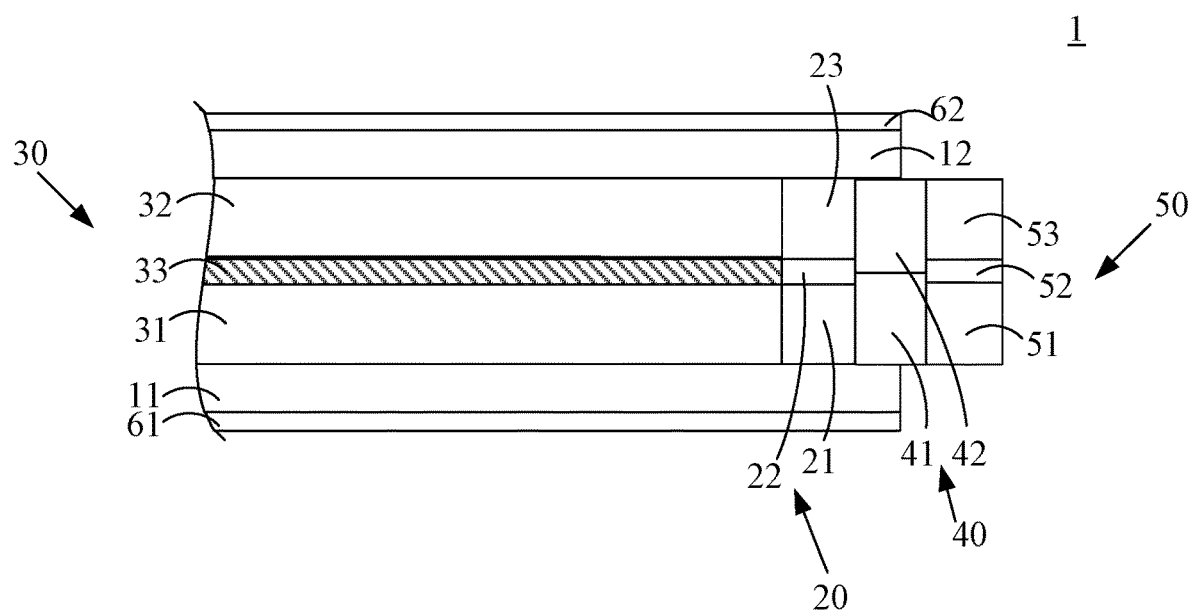

In addition, please refer to FIG. 6B and FIG. 6F to FIG. 6H, which show the combinations of the second outer glue frame 50, the first substrate 11, and the second substrate 12. One of or the combination of the first, second, and third outer glue layers 51, 52, 53 protrudes the first and second substrates 11, 12. As shown in FIG. 6B, the side ends of the first, second, and third outer glue layers 51, 52, 53 protrude the side ends of the first and second substrates 11, 12 concurrently. And, as shown in FIG. 6F, in contrast to the drawing of FIG. 6B, the second substrate 12 is shorter than the first substrate 11, and the side end of the second substrate 12 is located on the outside surface of the second glue frame 42 of the first outer glue frame 40. Furthermore, as shown in FIG. 6G, in contrast to the drawing of FIG. 6B, the first substrate 11 is shorter than the second substrate 12, and the side end of the first substrate 11 is located on the outside surface of the first glue frame 41 of the first outer glue frame 40. Finally, as shown in FIG. 6H, in contrast to the drawing of FIG. 6B, the second outer glue frame 50 and parts of the first outer glue frame 40 protrude the first and second substrates 11, 12 concurrently. The side end of the first substrate 11 is located on the outside surface of the first glue frame 41 of the first outer glue frame 40 and the side end of the second substrate 12 is located on the outside surface of the second glue frame 42 of the first outer glue frame 40.

Figure 7A:
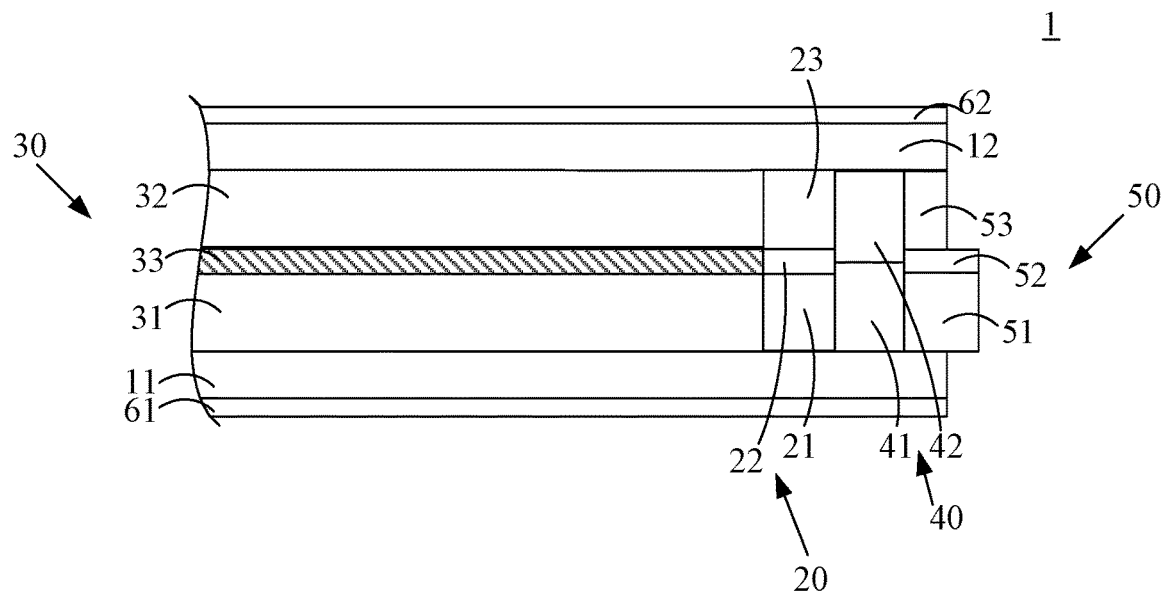
FIG. 7A to FIG. 7D show structural schematic diagrams according to the seventh embodiment of the present application.
Figure 7B:
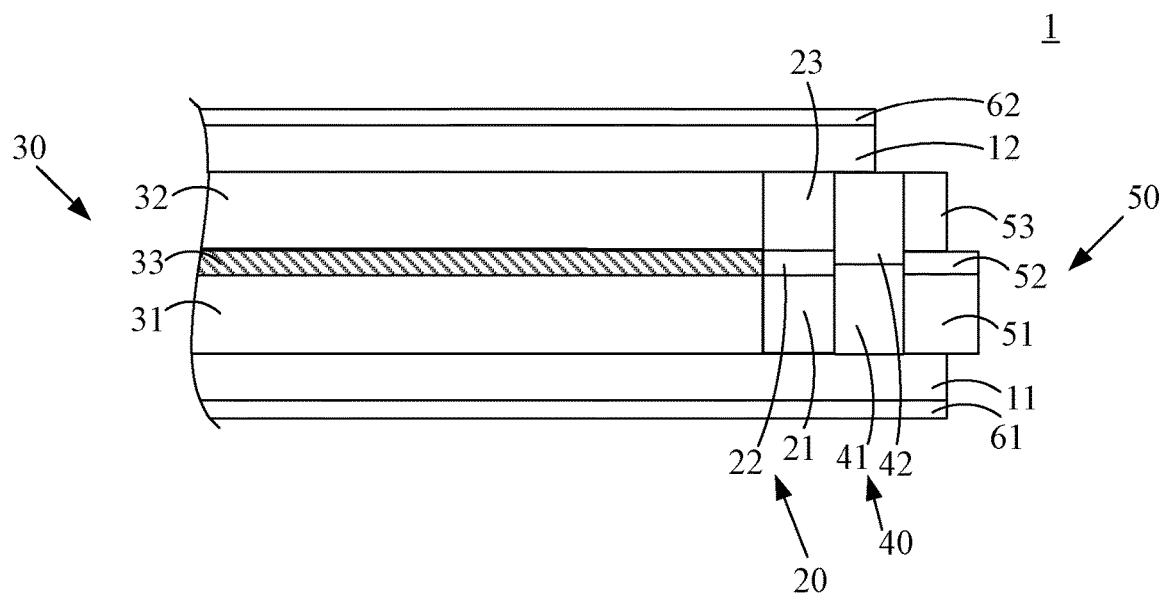
Figure 7C:
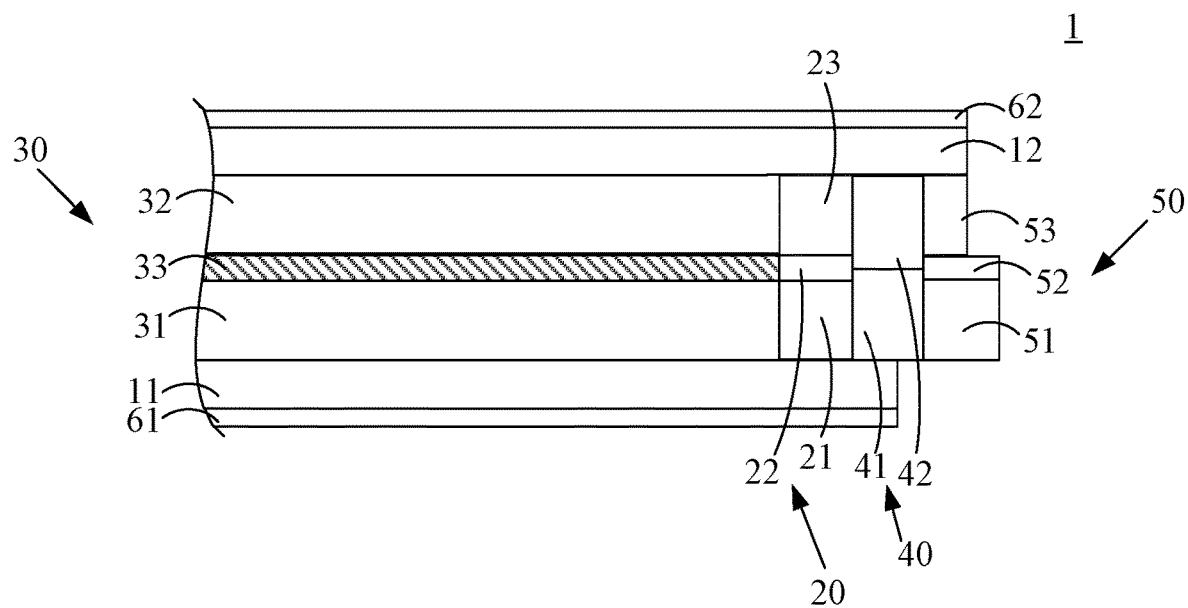
Figure 7D:
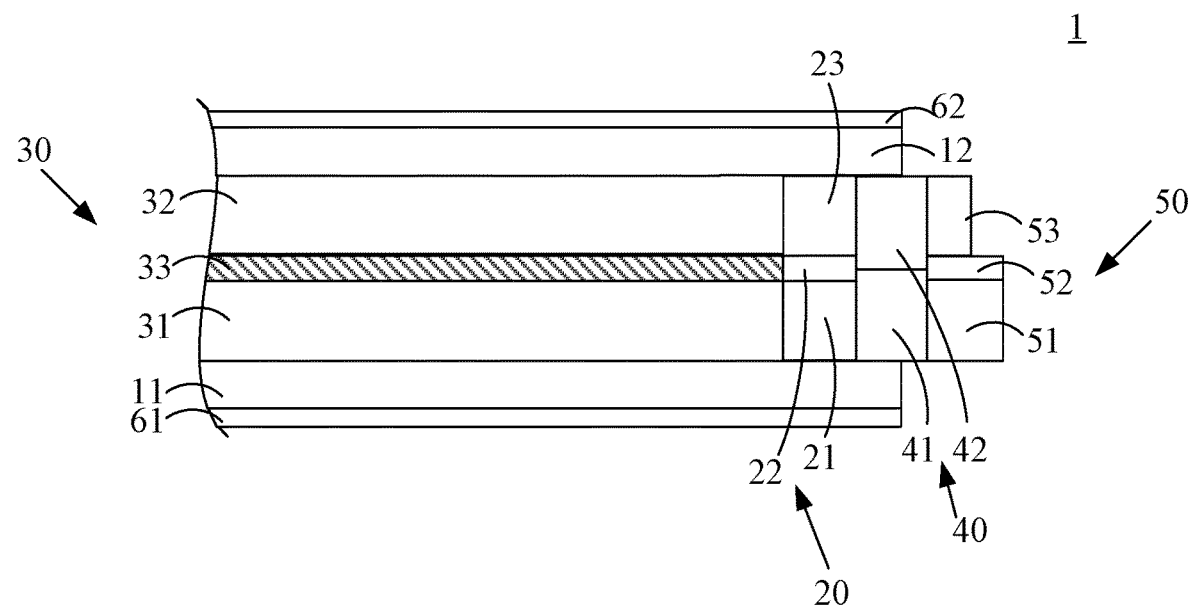

Please refer to FIG. 7A to FIG. 7D, which show structural schematic diagrams according to the seventh embodiment of the present application. The figures illustrate the combinations of the second outer glue frame 50, the first substrate 11, and the second substrate 12. The side end of the first and second outer glue layers 51, 52 protrude the first and second substrates 11, 12, and the third outer glue layer 53. As shown in FIG. 7A, the first and second outer glue layers 51, 52 protrude the first and second substrates 11, 12, and the third outer glue layer 53. And, as shown in FIG. 7B, in contrast to the drawing of FIG. 7A, the second substrate 12 is further shorter than the first substrate 11, and the side end of the second substrate 12 is located on the outside surface of the second glue frame 42 of the first outer glue frame 40. Furthermore, as shown in FIG. 7C, in contrast to the drawing of FIG. 7A, the first substrate 11 is shorter than the second substrate 12, and the side end of the first substrate 11 is located on the outside surface of the first glue frame 41 of the first outer glue frame 40. Finally, as shown in FIG. 7D, in contrast to the drawing of FIG. 7A, the second outer glue frame 50 and parts of the first outer glue frame 40 protrude the first and second substrates 11, 12 concurrently. The side end of the first substrate 11 is located on the outside surface of the first glue frame 41 of the first outer glue frame 40 and the side end of the second substrate 12 is located on the outside surface of the second glue frame 42 of the first outer glue frame 40.

Figure 8A:
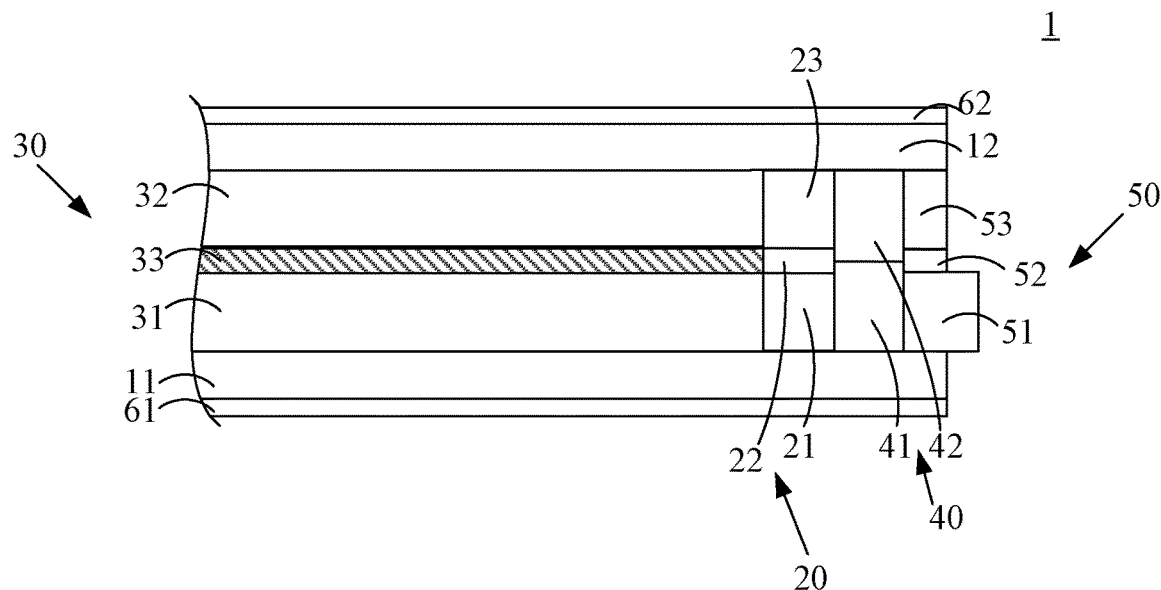
FIG. 8A to FIG. 8D show structural schematic diagrams according to the eighth embodiment of the present application.
Figure 8B:
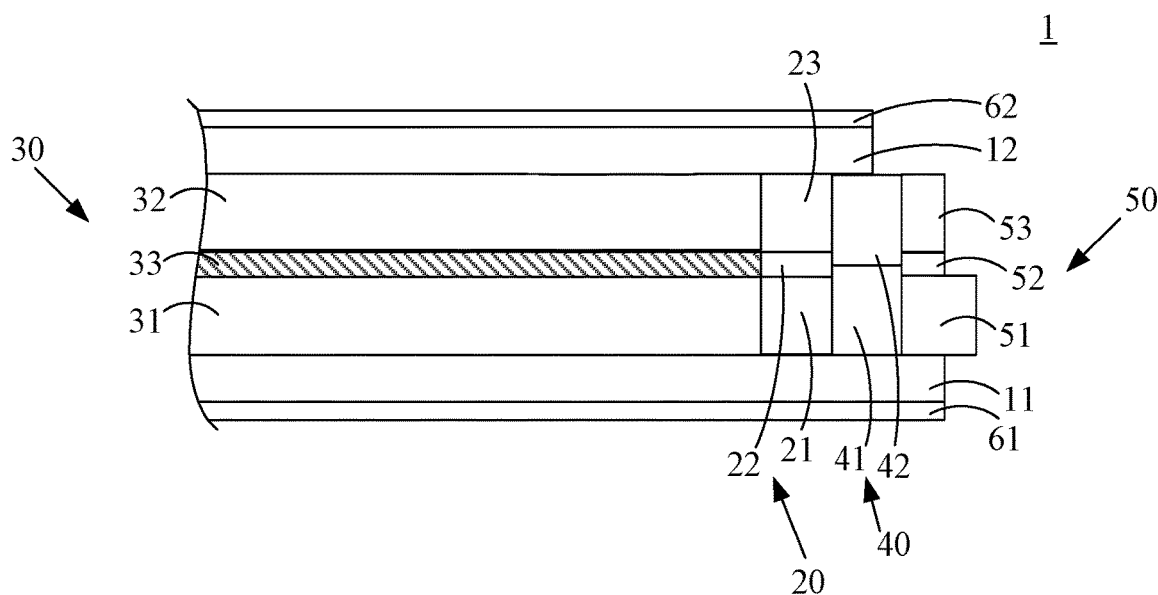
Figure 8C:
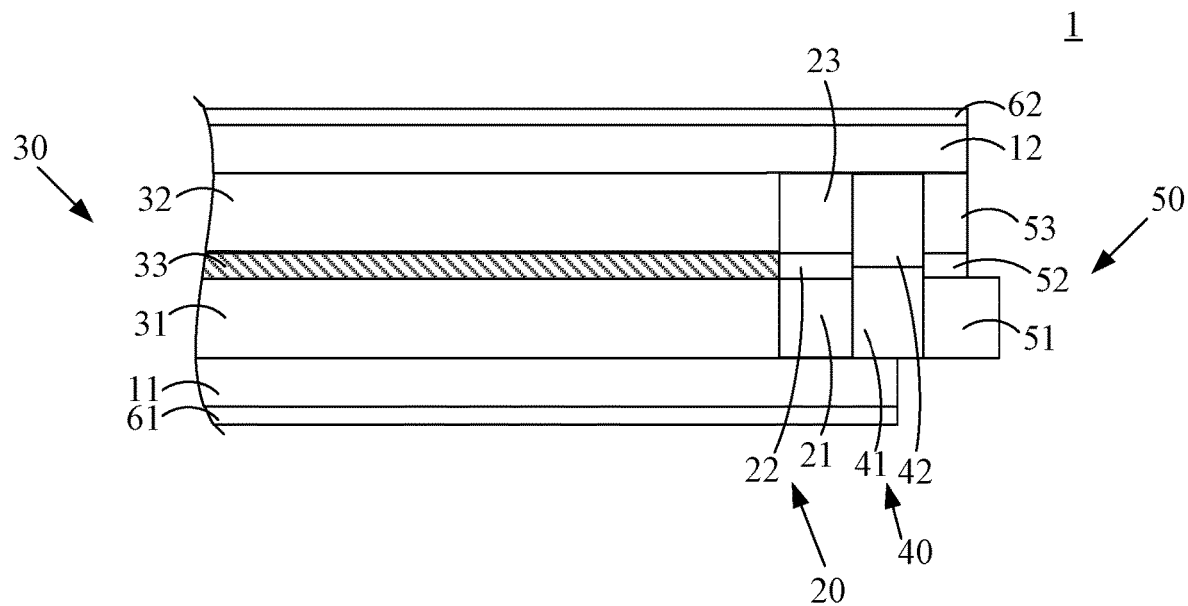
Figure 8D:
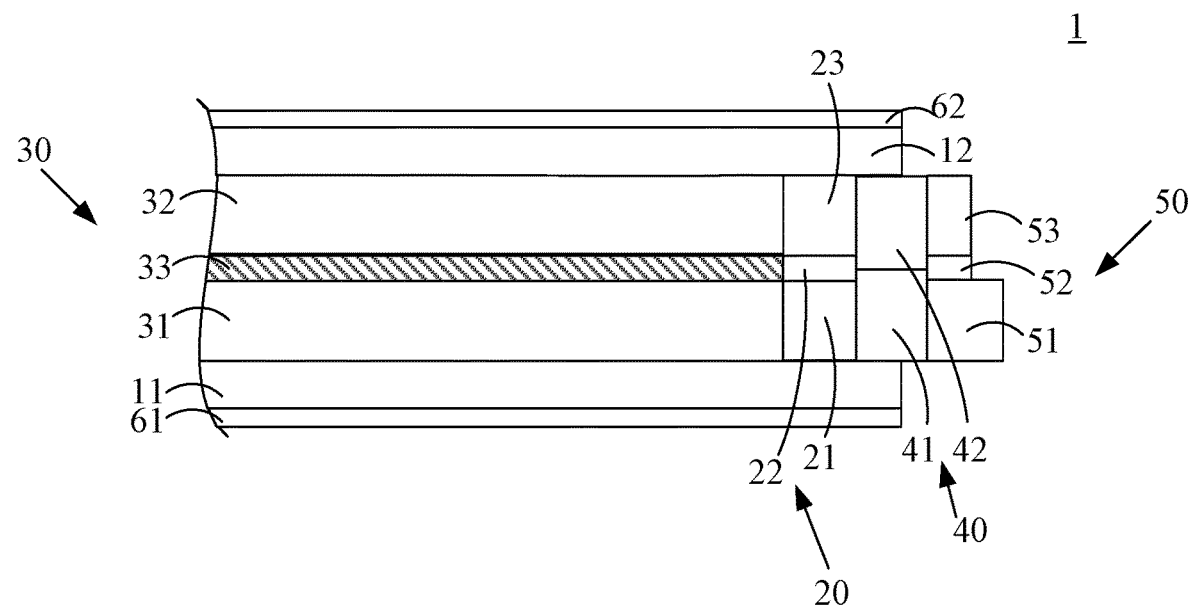

Please refer to FIG. 8A to FIG. 8D, which show structural schematic diagrams according to the eighth embodiment of the present application. The figures illustrate the combinations of the second outer glue frame 50, the first substrate 11, and the second substrate 12. The side end of the first outer glue layer 51 protrudes the side ends of the first and second substrates 11, 12, and the second and third outer glue layers 52, 53. As shown in FIG. 8A, the side end of the first outer glue layer 51 protrudes the side ends of the first and second substrates 11, 12, and the second and third outer glue layers 52, 53. And, as shown in FIG. 8B, in contrast to the drawing of FIG. 8A, the second substrate 12 is shorter than the first substrate 11, and the side end of the second substrate 12 is located on the outside surface of the second glue frame 42 of the first outer glue frame 40. Furthermore, as shown in FIG. 8C, in contrast to the drawing of FIG. 8A, the first substrate 11 is shorter than the second substrate 12, and the side end of the first substrate 11 is located on the outside surface of the first glue frame 41 of the first outer glue frame 40. Finally, as shown in FIG. 8D, in contrast to the drawing of FIG. 8A, the second outer glue frame 50 and parts of the first outer glue frame 40 protrudes the first and second substrates 11, 12. The side end of the first substrate 11 is located on the outside surface of the first glue frame 41 of the first outer glue frame 40 and the side end of the second substrate 12 is located on the outside surface of the second glue frame 42 of the first outer glue frame 40.

Figure 9A:
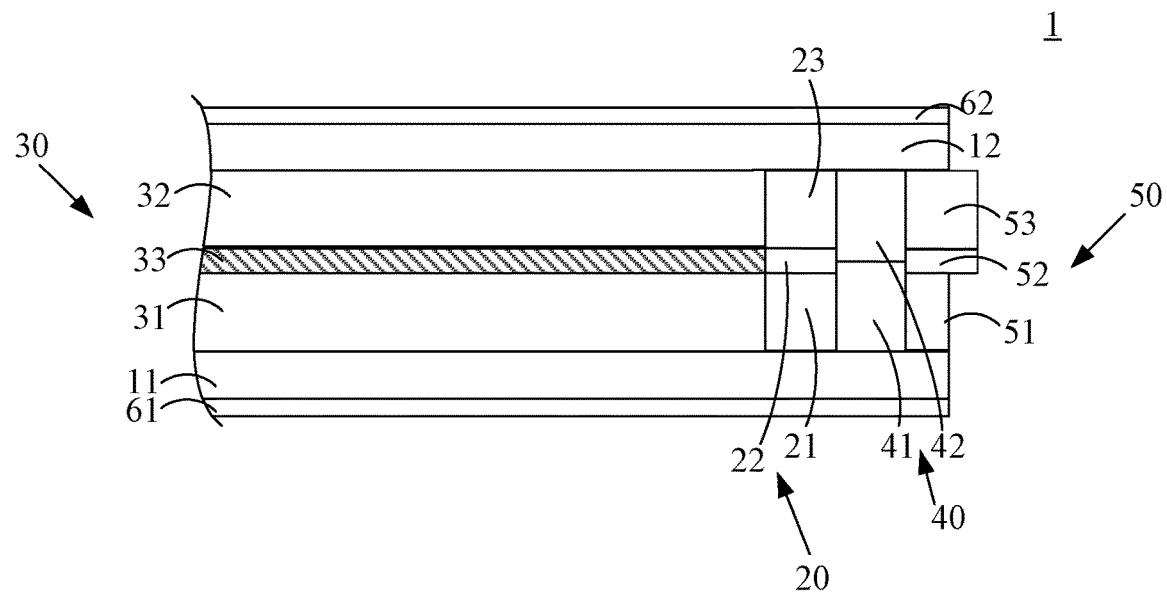
FIG. 9A to FIG. 9D show structural schematic diagrams according to the ninth embodiment of the present application.
Figure 9B:
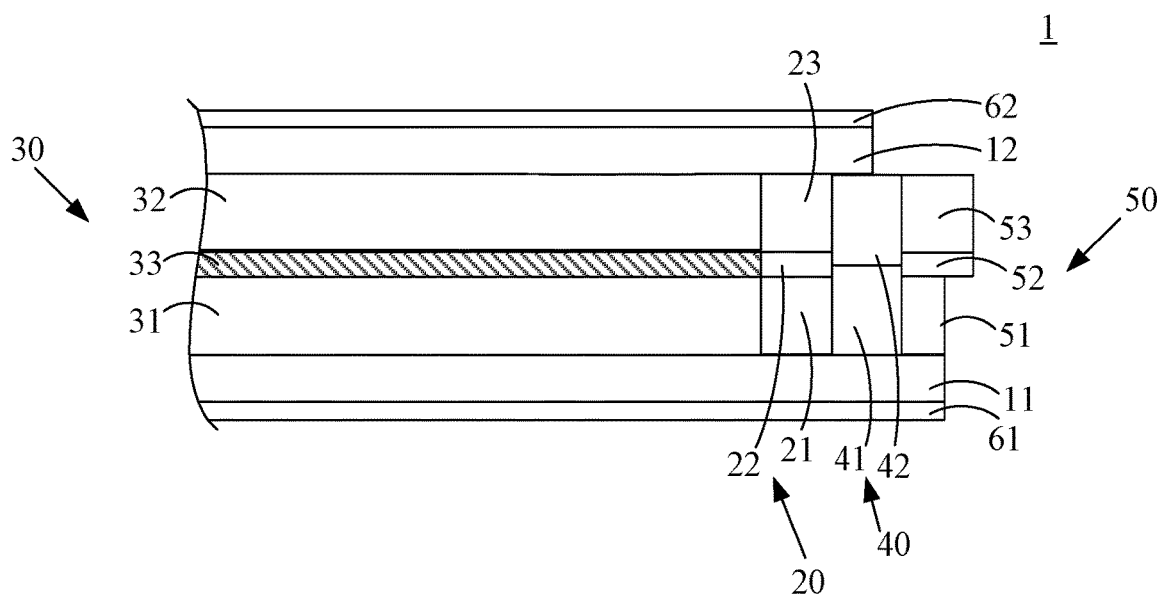

Please refer to FIG. 9A to FIG. 9D, which show structural schematic diagrams according to the ninth embodiment of the present application. The figures illustrate the combinations of the second outer glue frame 50, the first substrate 11, and the second substrate 12. The side ends of the second and third outer glue layers 52, 53 protrude the side ends of the first and second substrates 11, 12, and the first outer glue layer 51. As shown in FIG. 9A, the second and third outer glue layers 52, 53 protrude the first and second substrates 11, 12, and the first outer glue layer 51. And, as shown in FIG. 9B, in contrast to the drawing of FIG. 9A, the second substrate 12 is shorter than the first substrate 11, and the side end of the second substrate 12 is located on the outside surface of the second glue frame 42 of the first outer glue frame 40.

Figure 9C:
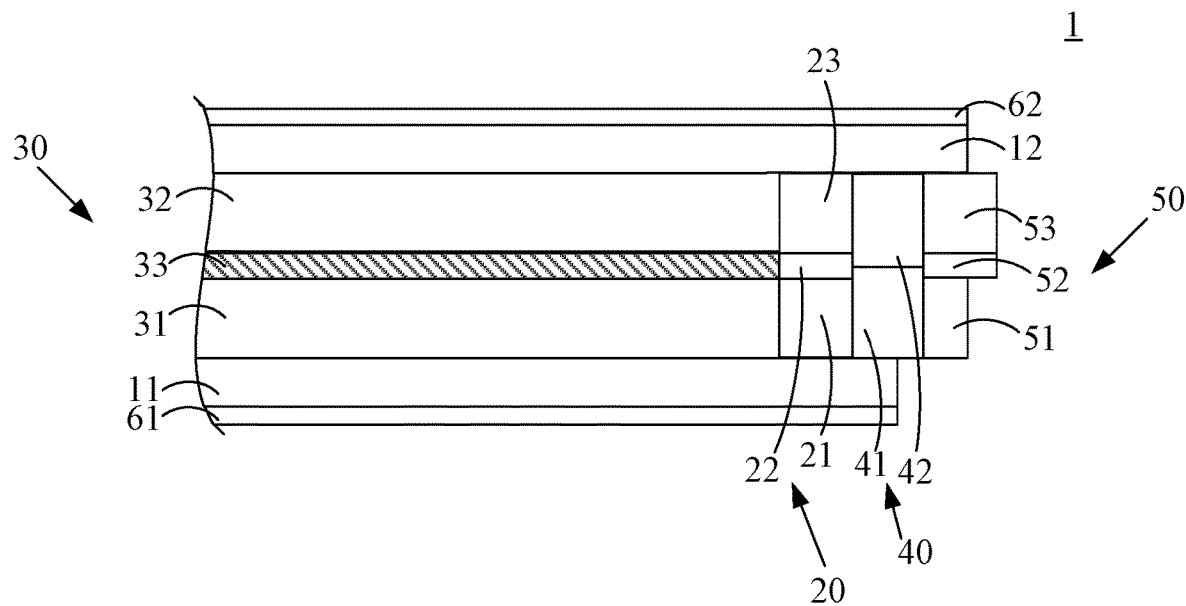
Figure 9D:
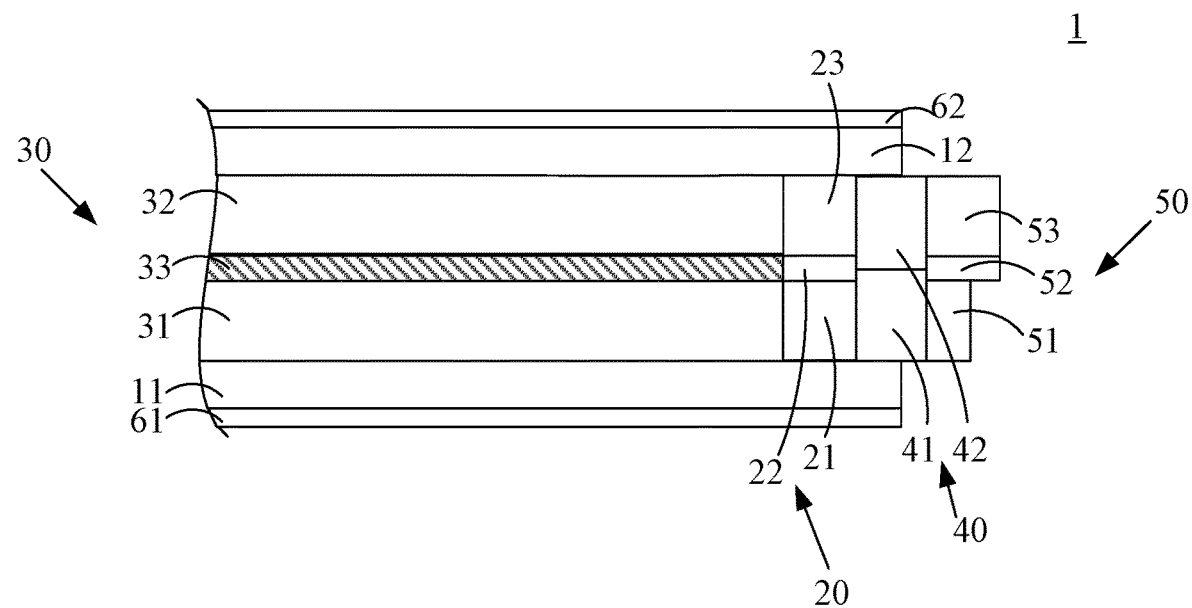

Furthermore, as shown in FIG. 9C, in contrast to the drawing of FIG. 9A, the first substrate 11 is shorter than the second substrate 12, and the side end of the first substrate 11 is located on the outside surface of the first glue frame 41 of the first outer glue frame 40. Finally, as shown in FIG. 9D, in contrast to the drawing of FIG. 9A, the second outer glue frame 50 and parts of the first outer glue frame 40 protrude the first and second substrates 11, 12 concurrently. The side end of the first substrate 11 is located on the outside surface of the first glue frame 41 of the first outer glue frame 40 and the side end of the second substrate 12 is located on the outside surface of the second glue frame 42 of the first outer glue frame 40.

Figure 10A:
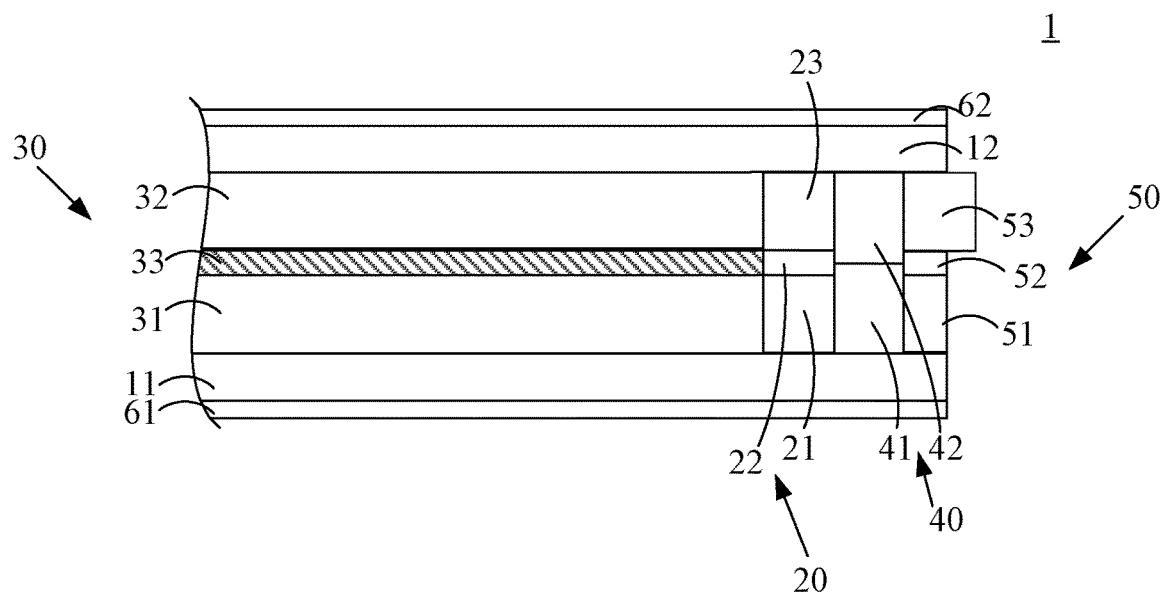
FIG. 10A to FIG. 10D show structural schematic diagrams according to the tenth embodiment of the present application.
Figure 10B:
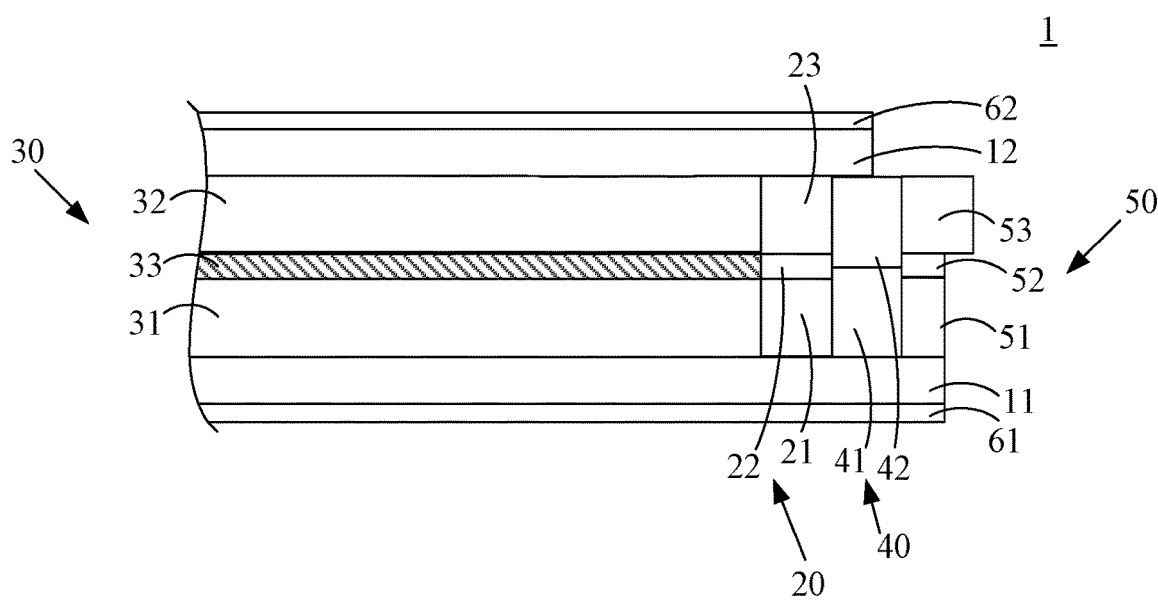
Figure 10C:
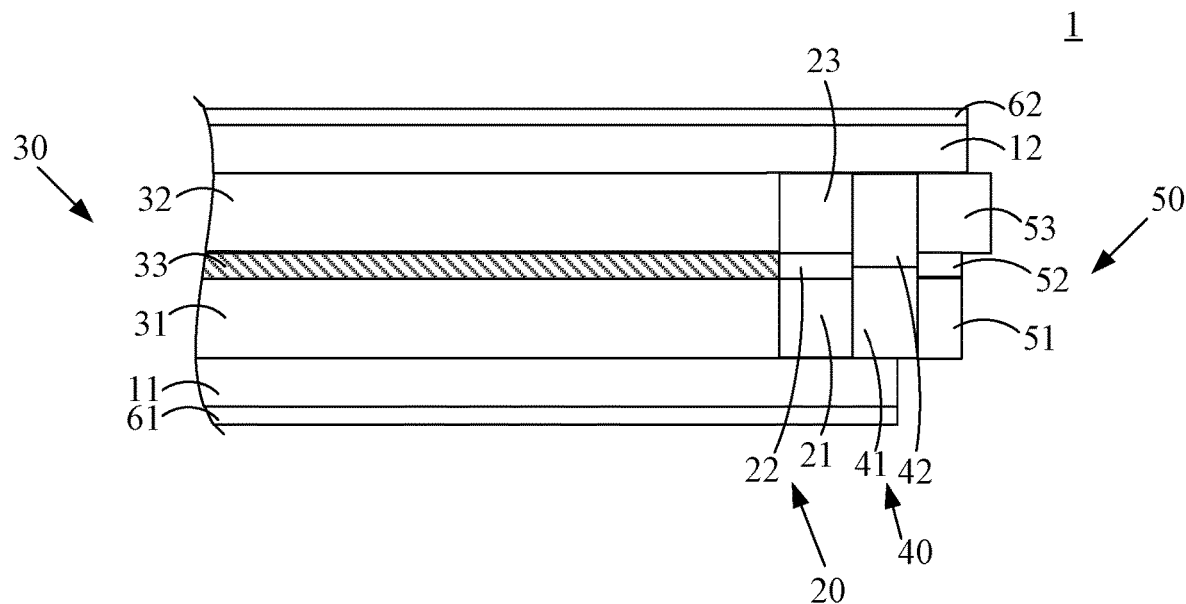
Figure 10D:
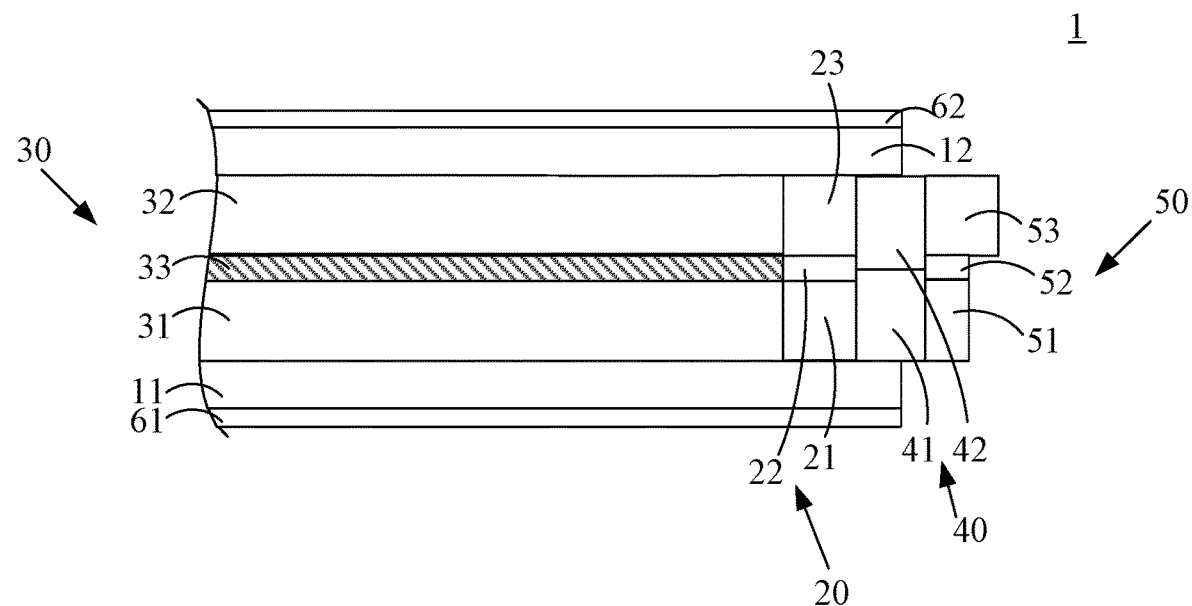

Please refer to FIG. 10A to FIG. 10D, which show structural schematic diagrams according to the tenth embodiment of the present application. The figures illustrate the combinations of the second outer glue frame 50, the first substrate 11, and the second substrate 12. The side end of the third outer glue layer 53 protrudes the side ends of the first and second substrates 11, 12, and the first and second outer glue layers 51, 52. As shown in FIG. 10A, the side end of the third outer glue layer 53 protrudes the side ends of the first and second substrates 11, 12, and the first and second outer glue layers 51, 52. And, as shown in FIG. 10B, in contrast to the drawing of FIG. 10A, the second substrate 12 is shorter than the first substrate 11, and the side end of the second substrate 12 is located on the outside surface of the second glue frame 42 of the first outer glue frame 40. Furthermore, as shown in FIG. 10C, in contrast to the drawing of FIG. 10A, the first substrate 11 is shorter than the second substrate 12, and the side end of the first substrate 11 is located on the outside surface of the first glue frame 41 of the first outer glue frame 40. Finally, as shown in FIG. 10D, in contrast to the drawing of FIG. 10A, the second outer glue frame 50 and parts of the first outer glue frame 40 protrudes the first and second substrates 11, 12. The side end of the first substrate 11 is located on the outside surface of the first glue frame 41 of the first outer glue frame 40 and the side end of the second substrate 12 is located on the outside surface of the second glue frame 42 of the first outer glue frame 40.

Figure 11A:
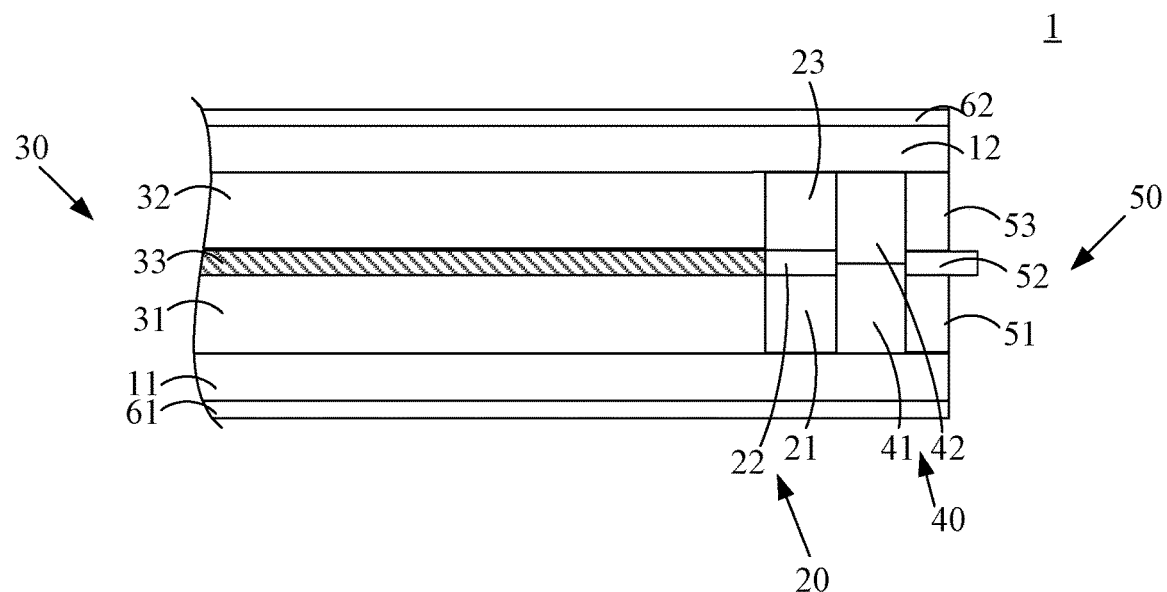
FIG. 11A to FIG. 11D show structural schematic diagrams according to the eleventh embodiment of the present application.
Figure 11B:
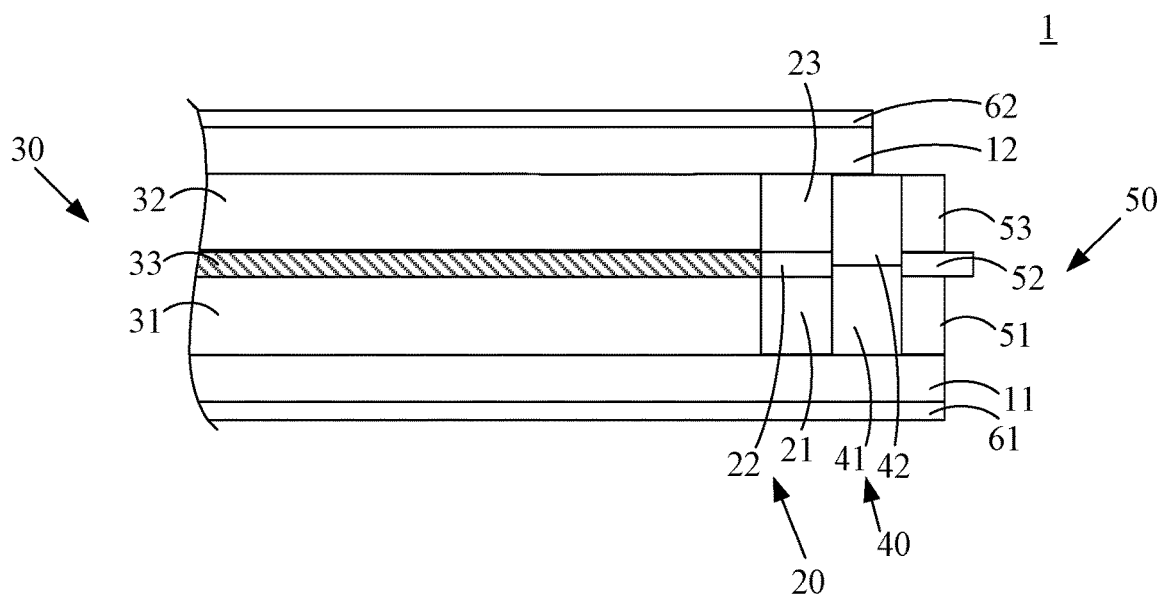
Figure 11C:
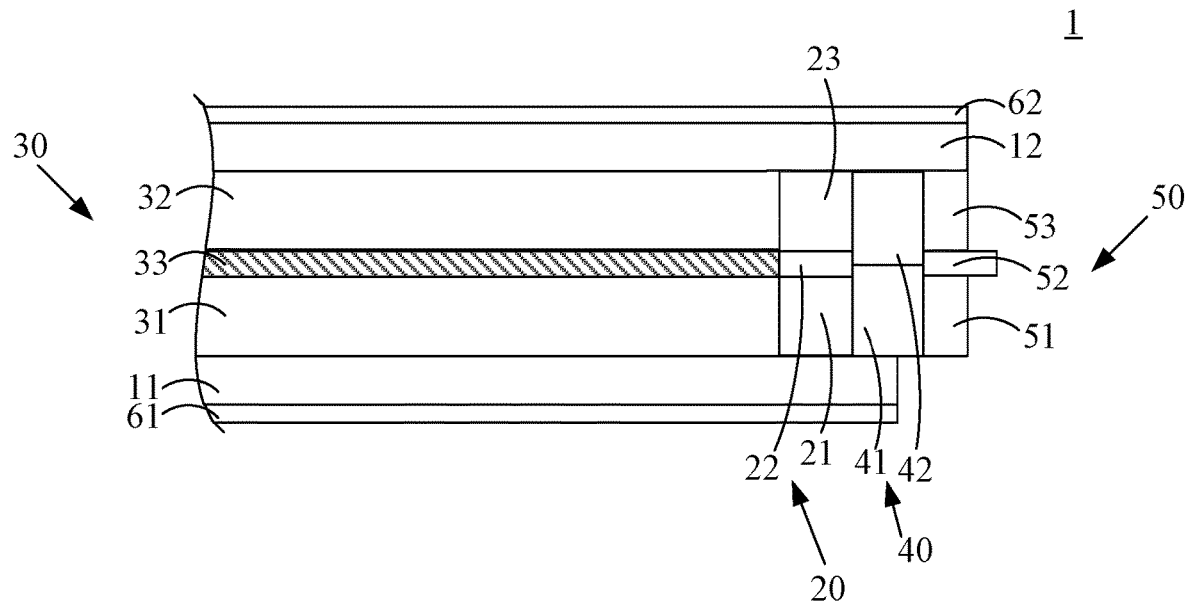
Figure 11D:
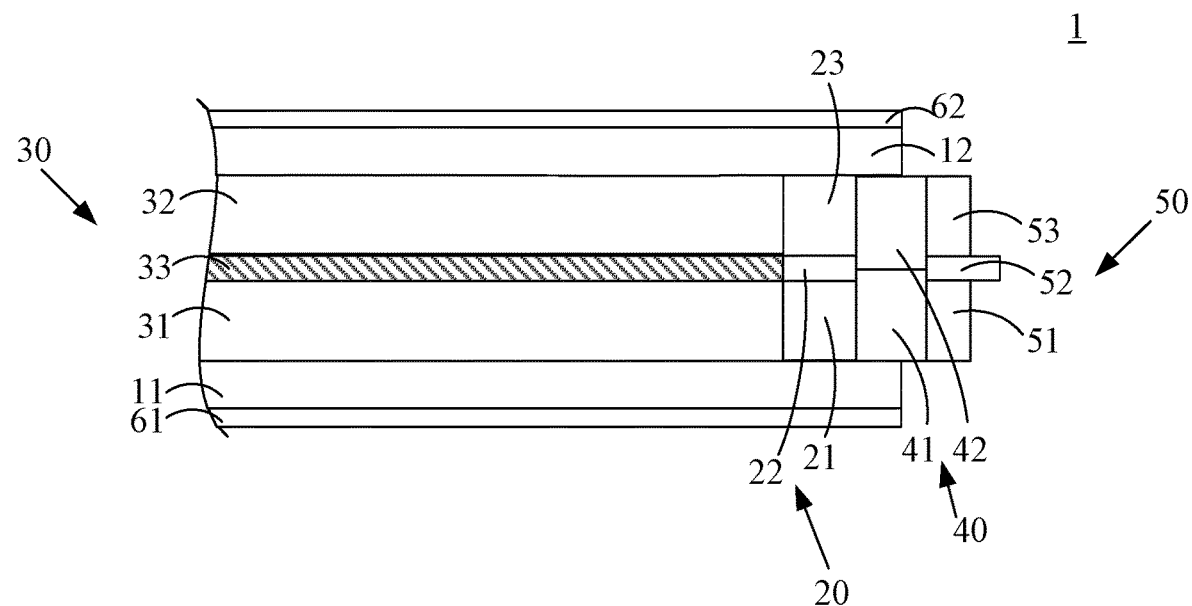

Please refer to FIG. 11A to FIG. 11D, which show structural schematic diagrams according to the eleventh embodiment of the present application. The figures illustrate the combinations of the second outer glue frame 50, the first substrate 11, and the second substrate 12. The side end of the second outer glue layer 52 protrudes the side ends of the first and second substrates 11, 12, and the first and third outer glue layer 51 and 53. As shown in FIG. 11A, the side end of the second outer glue layer 52 protrudes the side ends of the first and second substrates 11, 12, and the first and third outer glue layer 51 and 53. And, as shown in FIG. 11B, in contrast to the drawing of FIG. 11A, the second substrate 12 is shorter than the first substrate 11, and the side end of the second substrate 12 is located on the outside surface of the second glue frame 42 of the first outer glue frame 40. Furthermore, as shown in FIG. 11C, in contrast to the drawing of FIG. 11A, the first substrate 11 is shorter than the second substrate 12, and the side end of the first substrate 11 is located on the outside surface of the first glue frame 41 of the first outer glue frame 40. Finally, as shown in FIG. 11D, in contrast to the drawing of FIG. 11A, the second outer glue frame 50 and parts of the first outer glue frame 40 protrudes the first and second substrates 11, 12. The side end of the first substrate 11 is located on the outside surface of the first glue frame 41 of the first outer glue frame 40 and the side end of the second substrate 12 is located on the outside surface of the second glue frame 42 of the first outer glue frame 40.

Figure 12A:
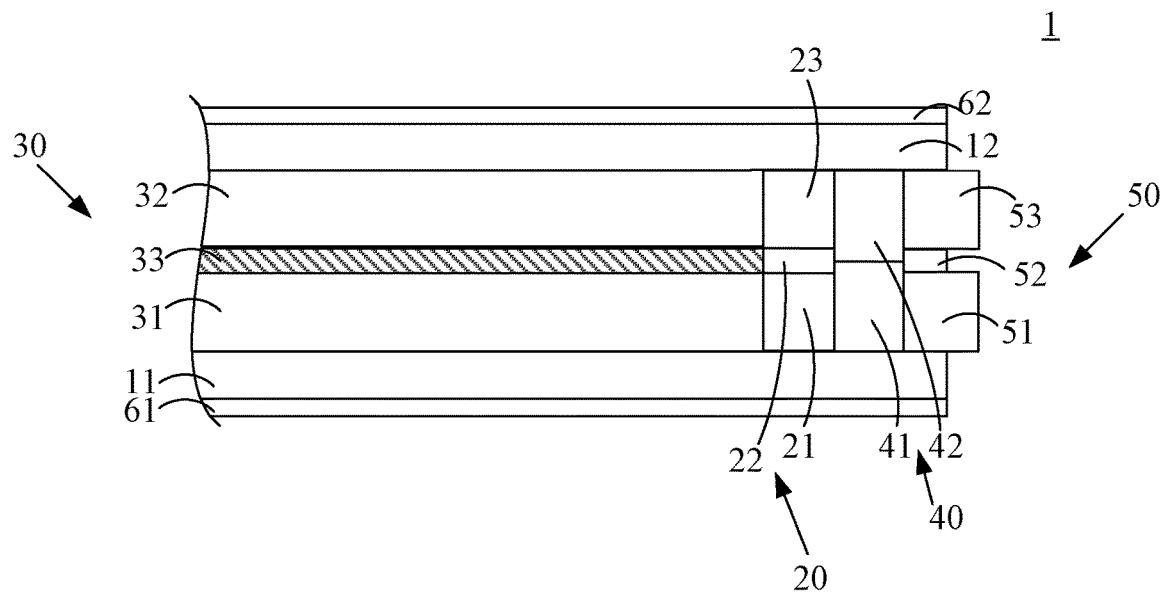
FIG. 12A to FIG. 12D show structural schematic diagrams according to the twelfth embodiment of the present application.
Figure 12B:
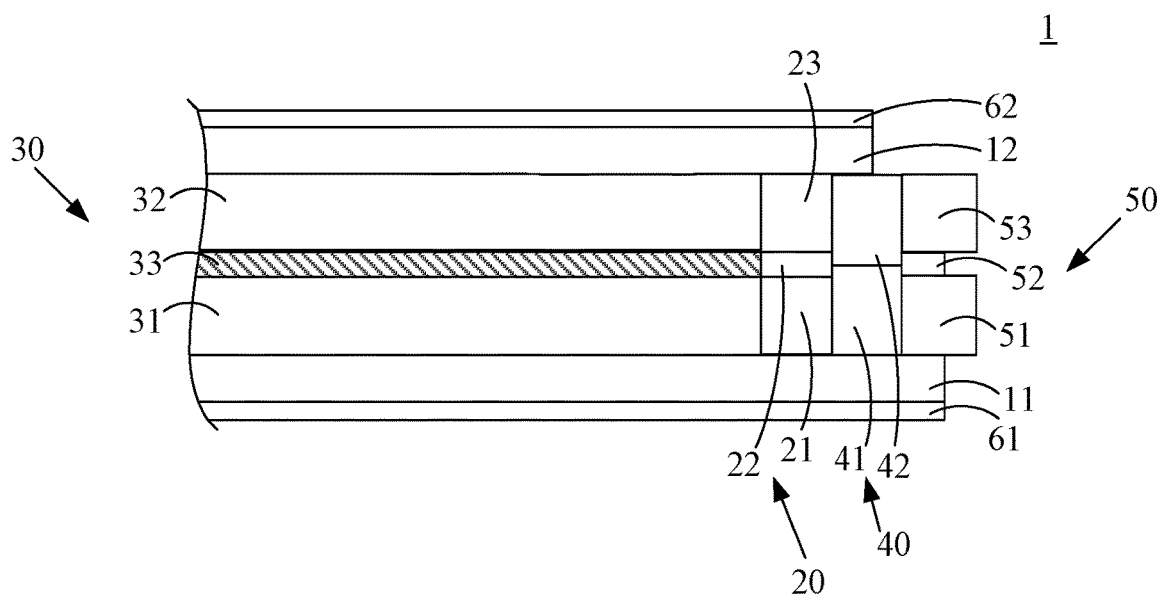
Figure 12C:
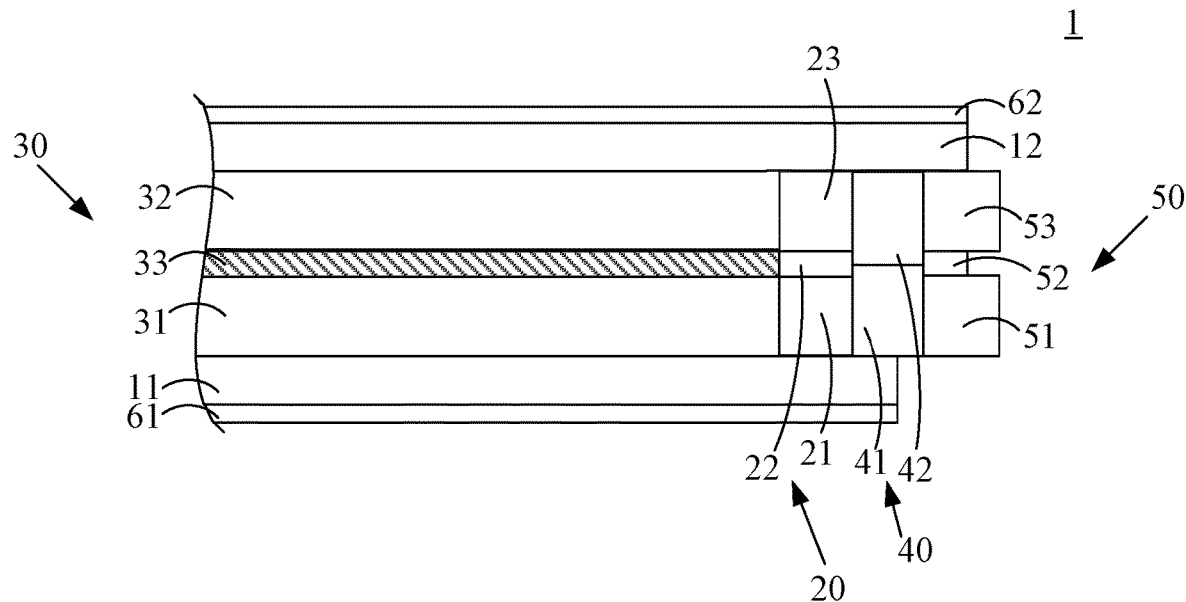
Figure 12D:
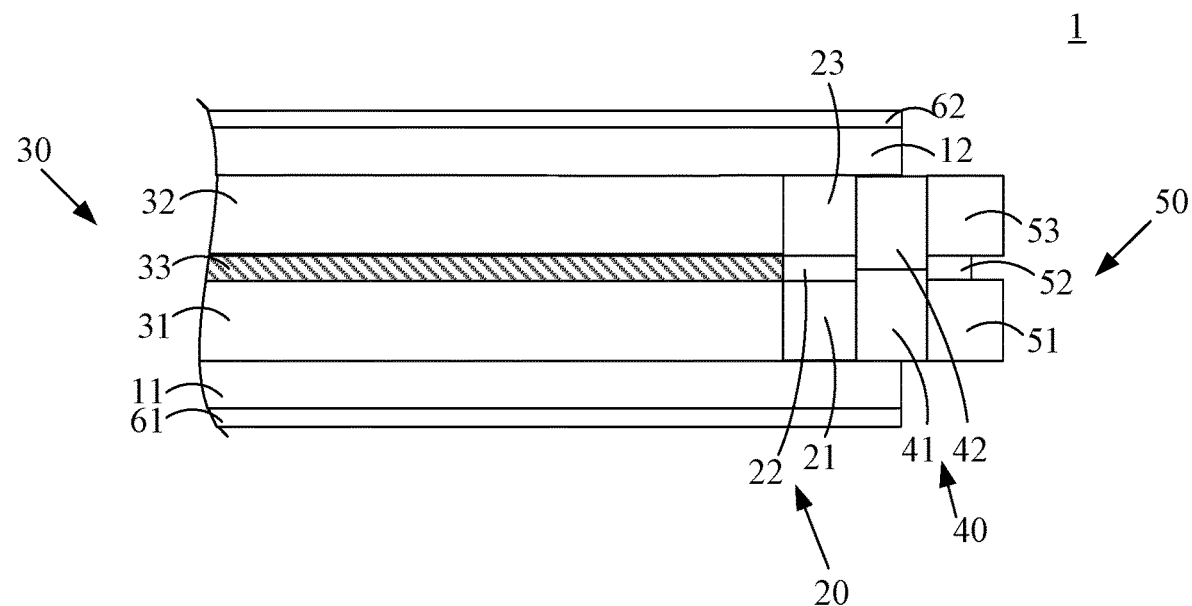

Please refer to FIG. 12A to FIG. 12D, which show structural schematic diagrams according to the twelfth embodiment of the present application. The figures illustrate the combinations of the second outer glue frame 50, the first substrate 11, and the second substrate 12. The side ends of the first and third outer glue layers 51, 53 protrude the side ends of the first and second substrates 11, 12, and the second outer glue layer 52. As shown in FIG. 12A, the side ends of the first and third outer glue layers 51, 53 protrude the side ends of the first and second substrates 11, 12, and the second outer glue layer 52. And, as shown in FIG. 12B, in contrast to the drawing of FIG. 12A, the second substrate 12 is shorter than the first substrate 11, and the side end of the second substrate 12 is located on the outside surface of the second glue frame 42 of the first outer glue frame 40. Furthermore, as shown in FIG. 12C, in contrast to the drawing of FIG. 12A, the first substrate 11 is shorter than the second substrate 12, and the side end of the first substrate 11 is located on the outside surface of the first glue frame 41 of the first outer glue frame 40. Finally, as shown in FIG. 12D, in contrast to the drawing of FIG. 12A, the second outer glue frame 50 and parts of the first outer glue frame 40 protrude the first and second substrates 11, 12 concurrently. The side end of the first substrate 11 is located on the outside surface of the first glue frame 41 of the first outer glue frame 40 and the side end of the second substrate 12 is located on the outside surface of the second glue frame 42 of the first outer glue frame 40.

Figure 13A:
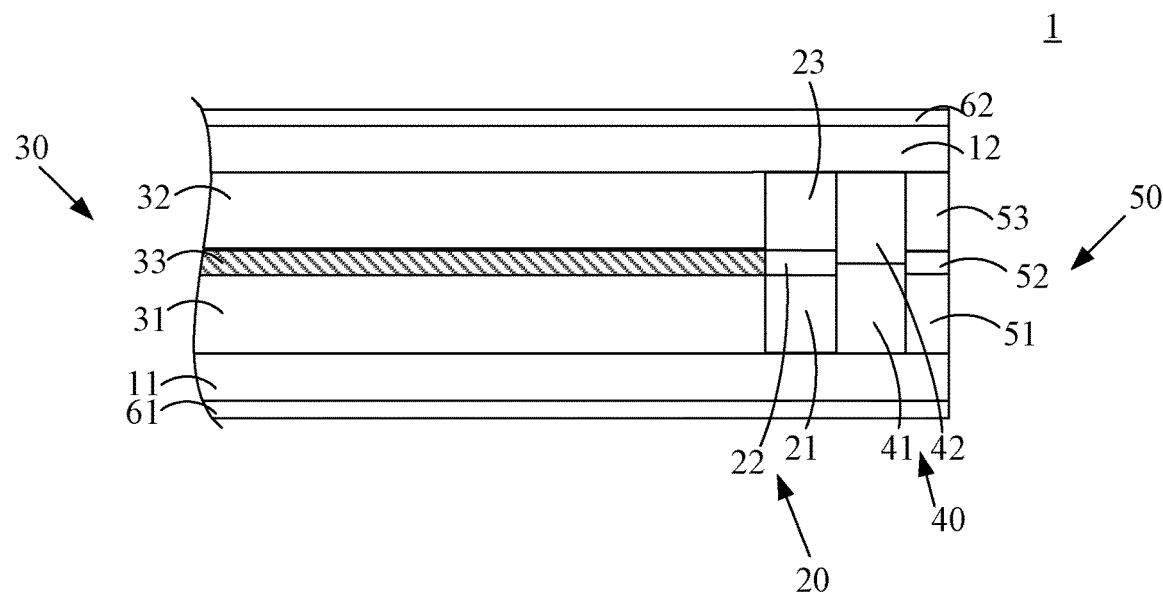
FIG. 13A to FIG. 13C show structural schematic diagrams according to the thirteenth embodiment of the present application.
Figure 13B:
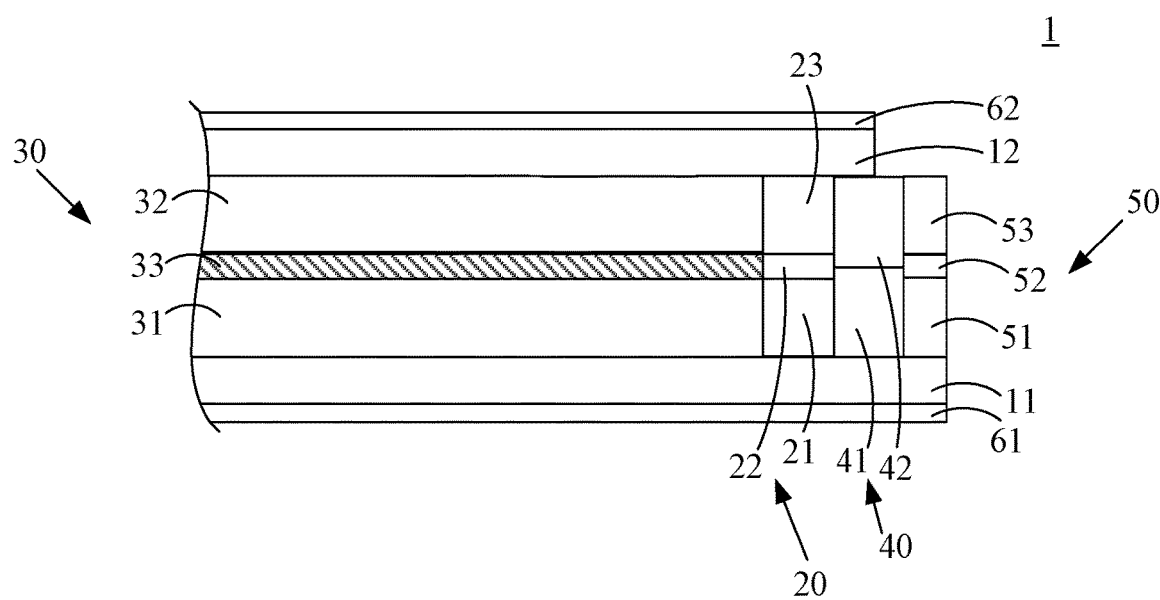
Figure 13C:
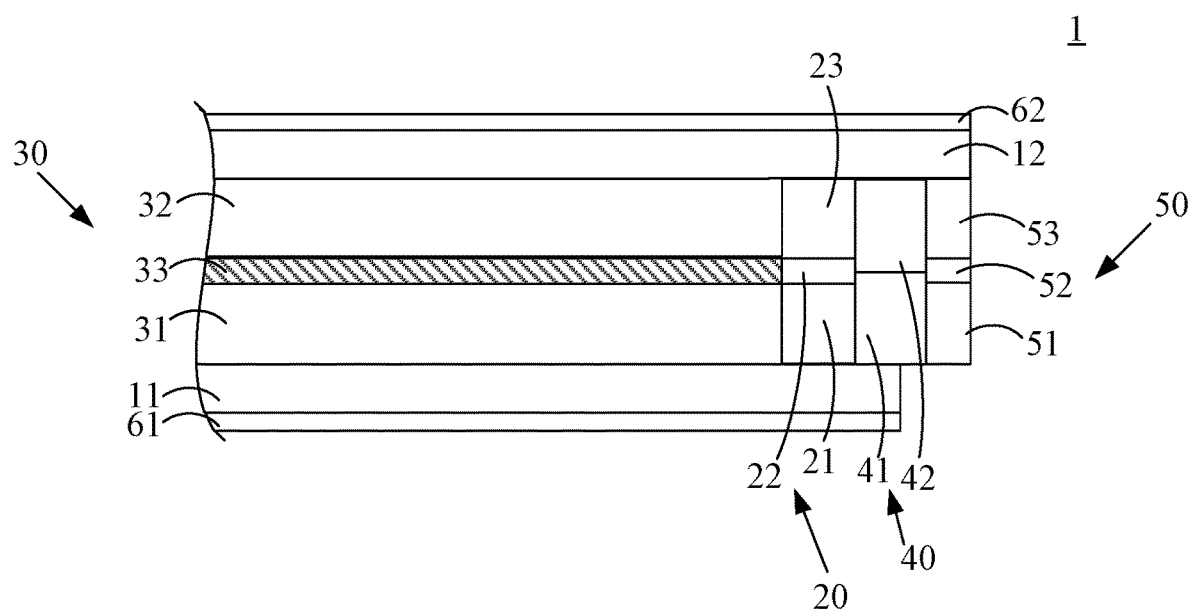

Please refer to FIG. 13A to FIG. 13C, which show structural schematic diagrams according to the thirteenth embodiment of the present application. The figures illustrate the combinations of the second outer glue frame 50, the first substrate 11, and the second substrate 12. One or the combination of the first and second substrates 11, 12 aligns with the second outer glue frame 50. As shown in FIG. 13A, the first and second substrates 11, 12 align with the second outer glue frame 50 concurrently. As shown in FIG. 13B, in contrast to the drawing of FIG. 13A, the second substrate 12 is shorter than the first substrate 11, and the side end of the second substrate 12 is located on the outside surface of the second glue frame 42 of the first outer glue frame 40. Furthermore, as shown in FIG. 13C, in contrast to the drawing of FIG. 13A, the first substrate 11 is shorter than the second substrate 12, and the side end of the first substrate 11 is located on the outside surface of the first glue frame 41 of the first outer glue frame 40.

Figure 14A:
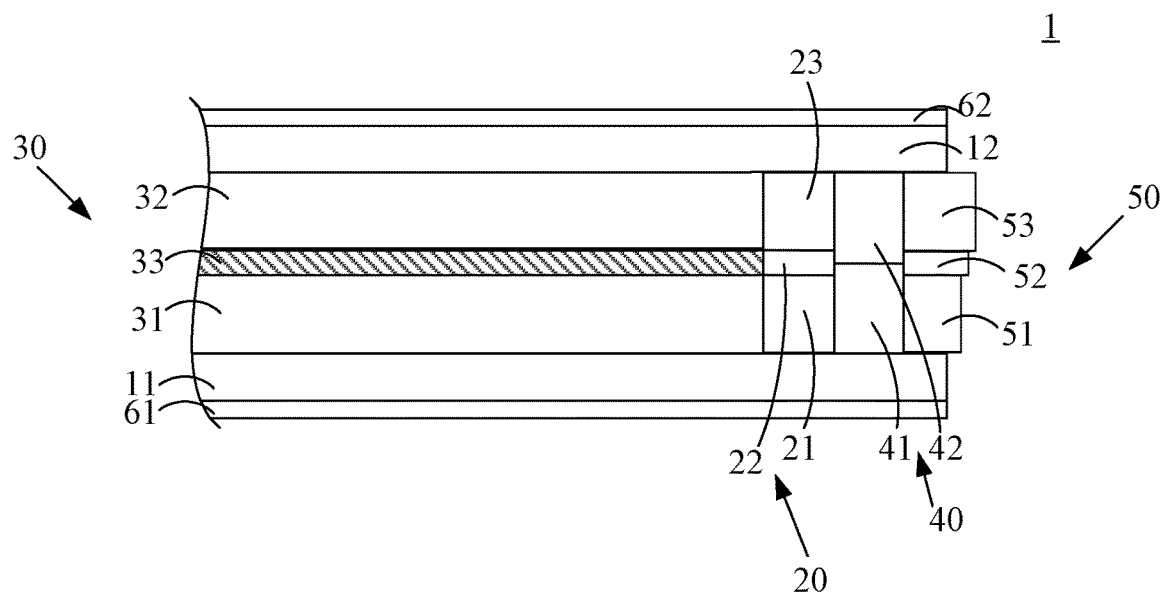
FIG. 14A to FIG. 14D show structural schematic diagrams according to the fourteenth embodiment of the present application.
Figure 14B:
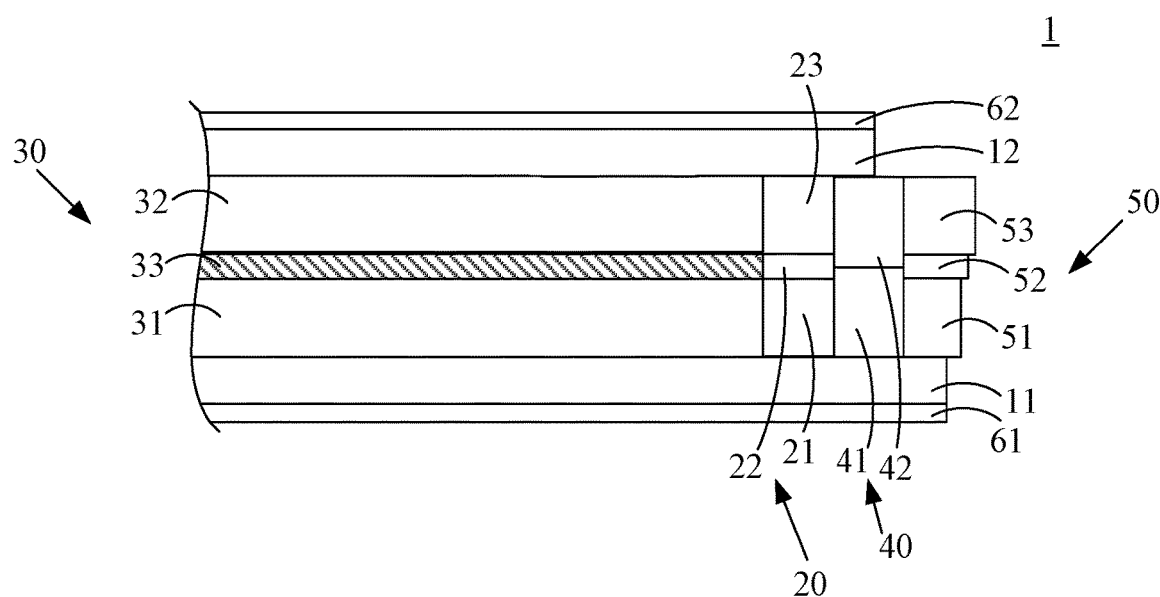
Figure 14C:
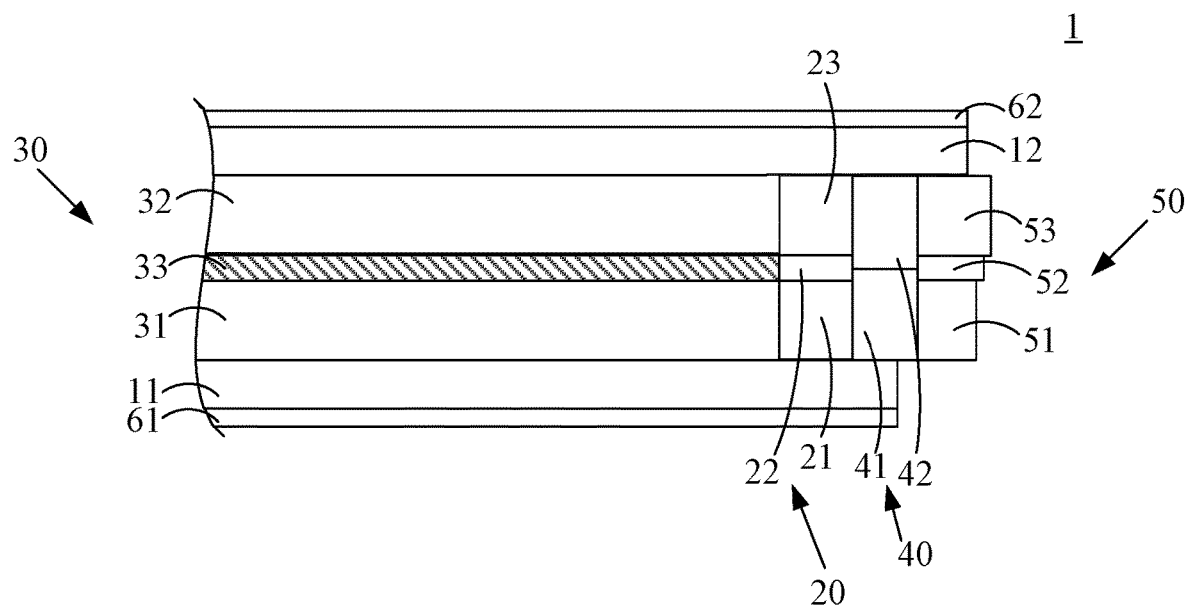
Figure 14D:
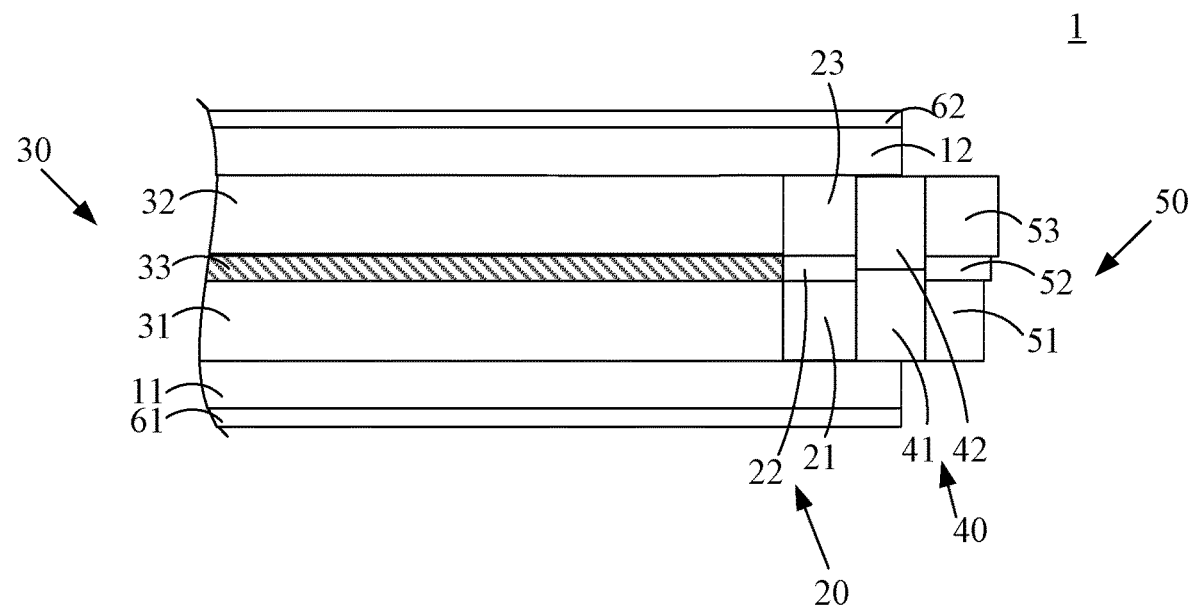

Please refer to FIG. 14A to FIG. 14D, which show structural schematic diagrams according to the fourteenth embodiment of the present application. The figures illustrate the combinations of the second outer glue frame 50, the first substrate 11, and the second substrate 12. The side ends of the first, second, and third outer glue layers 51, 52, 53 protrude the side ends of the first and second substrate 11, 12 in a ladder form. The side end of the third outer glue layer 53 is more protruding than the side ends of the first and second outer glue layers 51, 52. As shown in FIG. 14A, the side ends of the first, second, and third outer glue layers 51, 52, 53 protrude the side ends of the first and second substrate 11, 12 in a ladder form. The side end of the third outer glue layer 53 is more protruding than the side ends of the first and second outer glue layers 51, 52. As shown in FIG. 14B, in contrast to the drawing of FIG. 14A, the second substrate 12 is shorter than the first substrate 11, and the side end of the second substrate 12 is located on the outside surface of the second glue frame 42 of the first outer glue frame 40. Furthermore, as shown in FIG. 14C, in contrast to the drawing of FIG. 14A, the first substrate 11 is shorter than the second substrate 12, and the side end of the first substrate 11 is located on the outside surface of the first glue frame 41 of the first outer glue frame 40. Finally, as shown in FIG. 14D, in contrast to the drawing of FIG. 14A, the second outer glue frame 50 and parts of the first outer glue frame 40 protrude the first and second substrate 11, 12. The side end of the first substrate 11 is located on the outside surface of the first glue frame 41 of the first outer glue frame 40 and the side end of the second substrate 12 is located on the outside surface of the second glue frame 42 of the first outer glue frame 40.

Figure 15A:
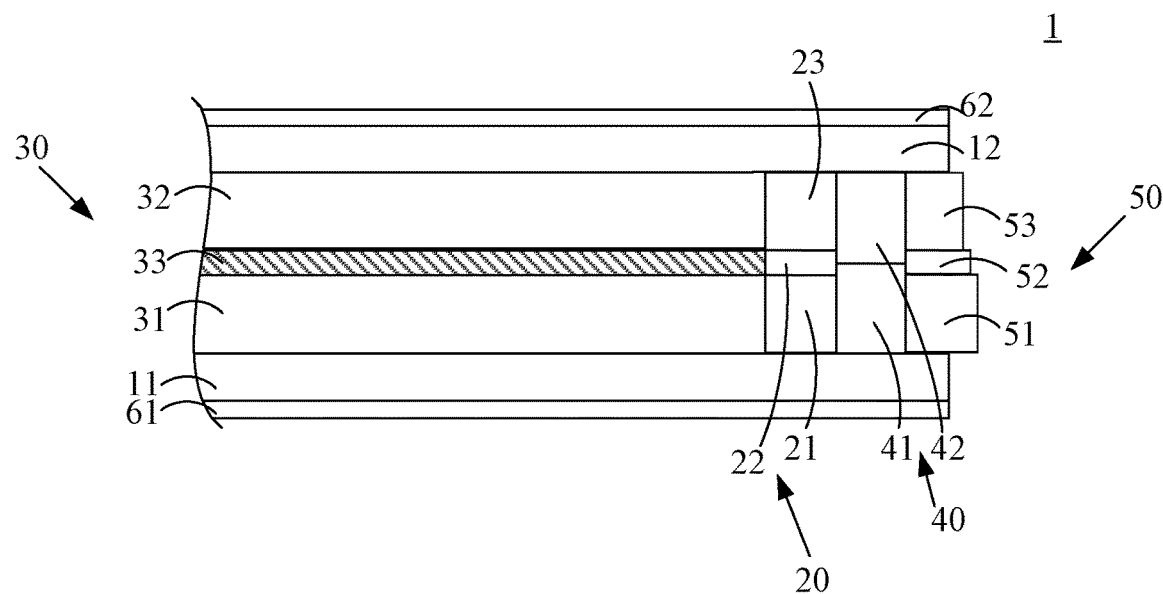
FIG. 15A to FIG. 15D show structural schematic diagrams according to the fifteenth embodiment of the present application.
Figure 15B:
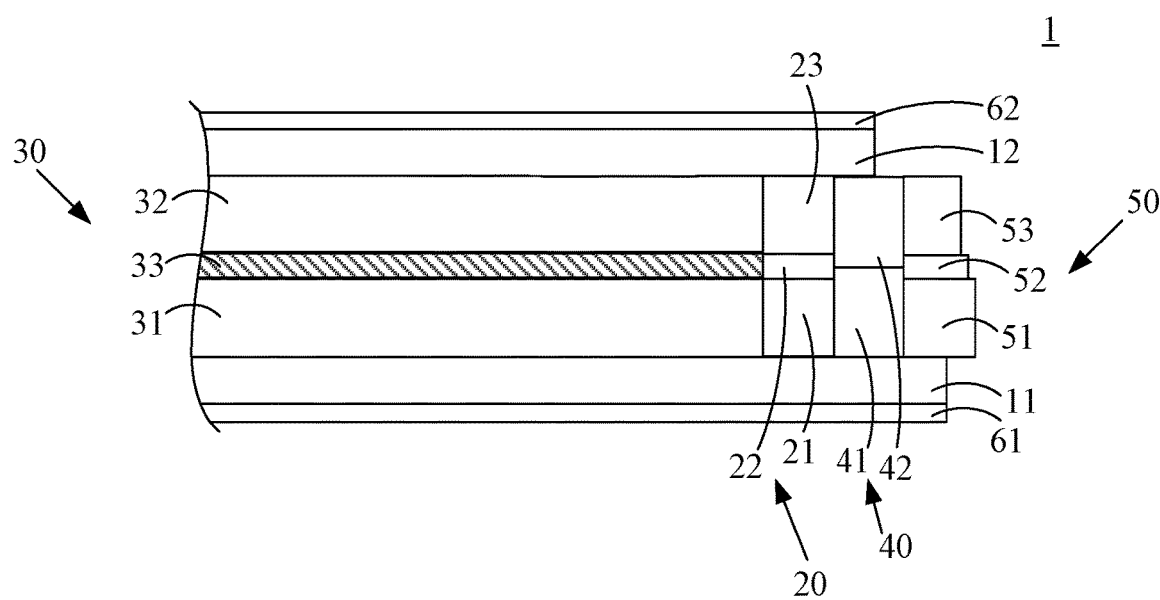
Figure 15C:
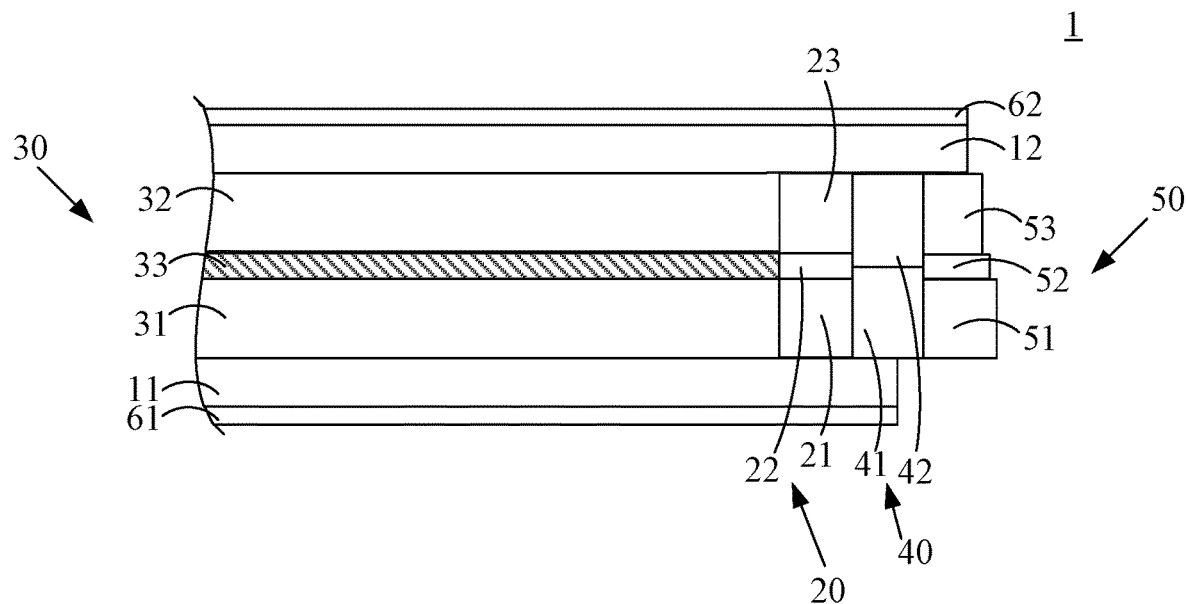
Figure 15D:
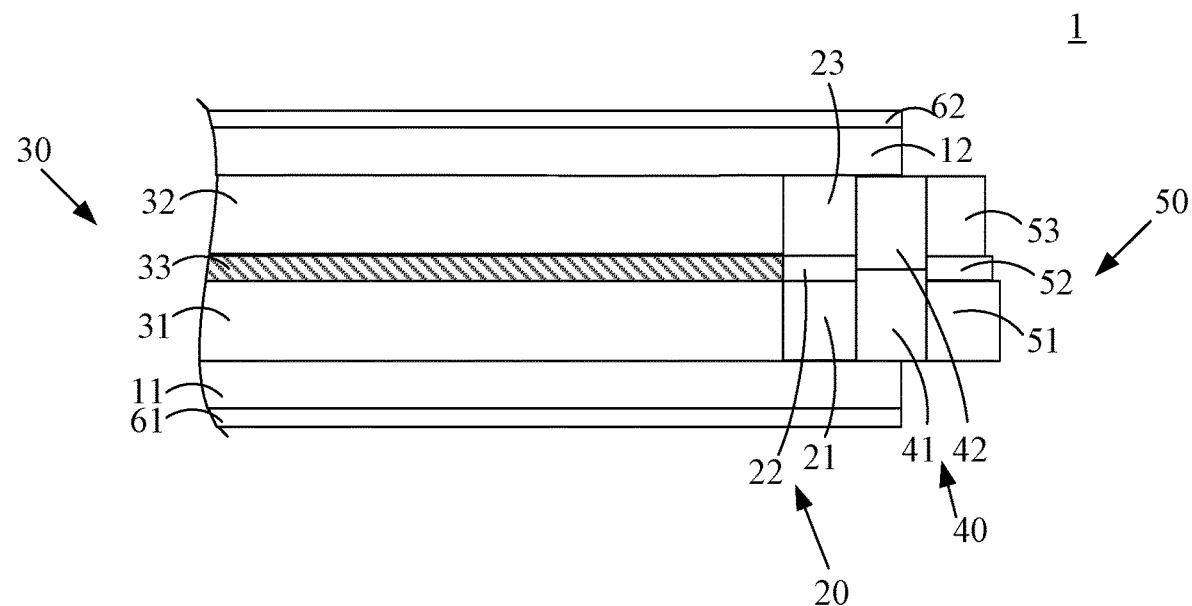

Finally, please refer to FIG. 15A to FIG. 15D, which show structural schematic diagrams according to the fifteenth embodiment of the present application. The figures illustrate the combinations of the second outer glue frame 50, the first substrate 11, and the second substrate 12. The side ends of the first, second, and third outer glue layers 51, 52, 53 protrude the side ends of the first and second substrate 11, 12 in a ladder form. The side end of the first outer glue layer 51 is more protruding than the side ends of the second and third outer glue layers 52, 53. As shown in FIG. 15A, the side ends of the first, second, and third outer glue layers 51, 52, 53 protrude the side ends of the first and second substrate 11, 12 in a ladder form. The side end of the first outer glue layer 51 is more protruding than the side ends of the second and third outer glue layers 52, 53. As shown in FIG. 15B, in contrast to the drawing of FIG. 15A, the second substrate 12 is shorter than the first substrate 11, and the side end of the second substrate 12 is located on the outside surface of the second glue frame 42 of the first outer glue frame 40. Furthermore, as shown in FIG. 15C, in contrast to the drawing of FIG. 15A, the first substrate 11 is shorter than the second substrate 12, and the side end of the first substrate 11 is located on the outside surface of the first glue frame 41 of the first outer glue frame 40. Finally, as shown in FIG. 15D, in contrast to the drawing of FIG. 15A, the second outer glue frame 50 and parts of the first outer glue frame 40 protrude the first and second substrate 11, 12. The side end of the first substrate 11 is located on the outside surface of the first glue frame 41 of the first outer glue frame 40 and the side end of the second substrate 12 is located on the outside surface of the second glue frame 42 of the first outer glue frame 40.

According to the above embodiments, the present application adopts the combinations of the second outer glue frame 50 (the first, second, and third outer glue layers 51, 52, 53), the first substrate 11, and the second substrate 12 to avoid damages such as side bumps and falls of the chemical system or contact to prevent the chemical system from contacting foreign metals. Thereby, the stability of the chemical system can be maintained.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

What is claimed is:

1. A package structure for a chemical system, comprising:
    a first substrate;
    a second substrate, opposing to the first substrate;
    an inner glue frame, disposed between the first substrate and the second substrate for forming an accommodating space, and a chemical system accommodated in the accommodating space; and
    a first outer glue frame, disposed between the first substrate and the second substrate, and located on an outer side of the inner glue frame;
    a second protection layer, disposed between the first glue frame and the first substrate;
    wherein the inner glue frame is selected from a thermosetting plastic and the first outer glue frame is selected from a thermoplastic, the first outer glue frame includes a first glue frame and a second glue frame; the first glue frame is disposed on an inner side of the first substrate; and the second glue frame is disposed on an inner side of the second substrate and combined with the first glue frame.

2. The package structure of claim 1, wherein the first glue frame and the second glue frame are melted to joint and forming the first outer glue frame.

3. The package structure of claim 1, wherein the inner glue frame further includes:
    a first inner glue layer, disposed on the inner side of the first substrate;
    a third inner glue layer, disposed on the inner side of the second substrate; and
    a second inner glue layer, disposed between the first inner glue layer and the third inner glue layer.

4. The package structure of claim 3, wherein the molar percentage of carbon in the first inner glue layer and the third inner glue layer is higher than the molar percentage of carbon in the second inner glue layer.

5. The package structure of claim 3, wherein the molar percentage of oxygen in the second inner glue layer is higher than the molar percentage of oxygen in the first inner glue layer and the third inner glue layer.

6. The package structure of claim 1, and further comprising a first protection layer disposed on an outer side of the first substrate.

7. The package structure of claim 1, and further comprising a first protection layer disposed on an outer side of the second substrate.

8. The package structure of claim 1, wherein the first substrate and the second substrate are a first electricity collecting layer and a second electricity collecting layer, respectively; and the chemical system is an electrochemical reaction system for supplying electrical energy.

9. The package structure of claim 8, wherein the electrochemical reaction system further includes:
    a first electrode layer, disposed on the inner side of the first electricity collecting layer;
    a second electrode layer, disposed on the inner side of the second electricity collecting layer; and an isolation layer, disposed between the first electrode layer and the second electrode layer.

10. The package structure of claim 8, wherein the first electricity collecting layer is shorter than the second electricity collecting layer.

11. The package structure of claim 1, and further comprising a second protection layer disposed between the second glue frame and the second substrate.

12. The package structure of claim 1, wherein the material of the second protection layer includes the thermosetting plastic.

13. The package structure of claim 11, wherein the material of the second protection layer includes the thermosetting plastic.

14. The package structure of claim 1, and further comprising a second outer glue frame, disposed between the first substrate and the second substrate, located on an outer side of the first outer glue frame, and selected from the thermosetting plastic.

15. The package structure of claim 14, wherein the second outer glue frame further includes:
a first outer glue layer, disposed on the inner side of the first substrate;
a third outer glue layer, disposed on the inner side of the second substrate; and
a second outer glue layer, disposed between the first outer glue layer and the third outer glue layer.

16. The package structure of claim 15, wherein the molar percentage of carbon in the first outer glue layer and the third outer glue layer is higher than the molar percentage of carbon in the second outer glue layer.

17. The package structure of claim 15, wherein the molar percentage of oxygen in the second outer glue layer is higher than the molar percentage of oxygen in the first outer glue layer and the third outer glue layer.

18. The package structure of claim 15, wherein one or the combination of the first outer glue layer, the second outer glue layer, and the third outer glue layer protrudes the first substrate and the second substrate.

19. The package structure of claim 18, wherein the second substrate is shorter than the first substrate.

20. The package structure of claim 18, wherein the first substrate is shorter than the second substrate.

21. The package structure of claim 15, wherein one or the combination of the first substrate and the second substrate aligns with the second outer glue frame.

* * * * *